(12) United States Patent
Blakeslee et al.

(10) Patent No.: US 7,805,340 B2
(45) Date of Patent: Sep. 28, 2010

(54) PERFORMING AN ON-DEMAND BOOK BALANCE TO PHYSICAL BALANCE RECONCILIATION PROCESS FOR LIQUID PRODUCT

(76) Inventors: Alan D. Blakeslee, 3074 N. 550 East, North Ogden, UT (US) 84414; Kerby L. Cate, 1381 E. 800 North, Layton, UT (US) 84040; John D. Hillam, 585 W. 2600 South, Perry, UT (US) 84302; Richard D. Peterson, 1950 S. 250 West, Perry, UT (US) 84302

( * ) Notice: Subject to any disclaimer, the term of this patent is extended or adjusted under 35 U.S.C. 154(b) by 994 days.

(21) Appl. No.: 11/062,322

(22) Filed: Feb. 18, 2005

(65) Prior Publication Data

US 2006/0157150 A1    Jul. 20, 2006

Related U.S. Application Data

(60) Provisional application No. 60/644,317, filed on Jan. 14, 2005.

(51) Int. Cl.
   *G06Q 10/00* (2006.01)
(52) U.S. Cl. .......................................... 705/28; 705/22
(58) Field of Classification Search ........................ None
   See application file for complete search history.

(56) References Cited

U.S. PATENT DOCUMENTS

| 3,934,756 | A | 1/1976 | Young et al. .................... 222/28 |
| 3,949,207 | A | 4/1976 | Savary et al. ............ 235/151.34 |
| 4,011,752 | A | 3/1977 | Fowler ........................... 73/189 |
| 4,106,007 | A | 8/1978 | Johnston et al. |
| 4,335,448 | A | 6/1982 | VanNess ...................... 364/900 |
| 4,521,372 | A | 6/1985 | Price et al. ................... 376/250 |
| 4,636,475 | A | 1/1987 | Price et al. ...................... 436/3 |
| 4,796,469 | A | 1/1989 | Brown et al. |
| 4,876,530 | A | 10/1989 | Hill et al. ..................... 340/605 |
| 4,882,929 | A | 11/1989 | Brown ......................... 73/49.2 |

(Continued)

OTHER PUBLICATIONS

International Search Report mailed May 16, 2008, cited in related application, Serial No. PCT/US2006/001236 (Attached and referred to as Document 1).

(Continued)

*Primary Examiner*—F. Zeender
*Assistant Examiner*—Christopher Buchanan
(74) *Attorney, Agent, or Firm*—Workman Nydegger

(57) ABSTRACT

Disclosed are methods, systems, and computer program products for performing an on-demand book balance to physical balance reconciliation process for liquid product. The method can include receiving an indication that a delivery of product is about to occur at a retail facility. Based on the received indication, and optionally while fuel is dispensed from one or more storage tanks, a first book balance to physical balance reconciliation can be initiated for one or more storage tanks at the retail facility prior to receiving a delivery of liquid product. Following completion of the first book to physical balance reconciliation, an amount of liquid product as indicated on a delivery document is delivered and then the system automatically performs a second book to physical reconciliation process to identify one or more discrepancies between the amount of liquid product in the storage tanks and a physical amount of liquid product actually delivered.

25 Claims, 11 Drawing Sheets

U.S. PATENT DOCUMENTS

| | | | | |
|---|---|---|---|---|
| 5,132,923 | A * | 7/1992 | Crawford et al. | 702/51 |
| 5,154,314 | A * | 10/1992 | Van Wormer | 222/1 |
| 5,156,042 | A | 10/1992 | Carlin et al. | 73/49.2 |
| 5,297,423 | A * | 3/1994 | Keating et al. | 73/49.2 |
| 5,319,545 | A | 6/1994 | McGarvey et al. | 364/403 |
| 5,363,093 | A * | 11/1994 | Williams et al. | 340/605 |
| 5,400,253 | A * | 3/1995 | O'Connor | 701/123 |
| 5,423,457 | A * | 6/1995 | Nicholas et al. | 222/62 |
| 5,596,501 | A | 1/1997 | Comer et al. | 364/464.23 |
| 5,665,895 | A | 9/1997 | Hart et al. | 73/1.73 |
| 5,706,273 | A | 1/1998 | Guerreri | 364/510 |
| 5,757,664 | A | 5/1998 | Rogers et al. | 364/509 |
| 5,901,879 | A | 5/1999 | Duhaime et al. | |
| 6,128,551 | A | 10/2000 | Davis et al. | 700/236 |
| 6,341,629 | B1 | 1/2002 | Clark et al. | 141/83 |
| 6,401,045 | B1 | 6/2002 | Rogers et al. | 702/51 |
| 6,522,947 | B1 | 2/2003 | Hartsell, Jr. | 700/241 |
| 6,691,061 | B1 | 2/2004 | Rogers et al. | 702/156 |
| 6,715,514 | B2 * | 4/2004 | Parker et al. | 141/1 |
| 6,835,223 | B2 | 12/2004 | Walker et al. | |
| 6,909,986 | B2 | 6/2005 | Rogers et al. | |
| 6,934,644 | B2 | 8/2005 | Rogers et al. | |
| 7,177,780 | B2 | 2/2007 | Hillam et al. | |
| 7,178,561 | B2 | 2/2007 | Memmott et al. | |
| 7,181,361 | B2 | 2/2007 | Memmott et al. | |
| 7,185,683 | B2 * | 3/2007 | Hillam et al. | 141/198 |
| 7,197,409 | B2 | 3/2007 | Hillam et al. | |
| 7,346,427 | B2 | 3/2008 | Hillam et al. | |
| 7,360,697 | B1 | 4/2008 | Sarkar et al. | |
| 7,392,112 | B2 | 6/2008 | Dillard | |
| 7,536,264 | B2 | 5/2009 | Hillam et al. | |
| 7,546,256 | B2 | 6/2009 | Hillam et al. | |
| 7,574,385 | B2 | 8/2009 | Hillam et al. | |
| 7,689,371 | B2 | 3/2010 | Memmott et al. | |
| 2002/0049549 | A1 | 4/2002 | Rogers et al. | |
| 2004/0022689 | A1 | 2/2004 | Wulf et al. | 422/100 |
| 2004/0172372 | A1 | 9/2004 | Wells et al. | |
| 2005/0028610 | A1 | 2/2005 | Olivier et al. | |
| 2005/0126265 | A1 | 6/2005 | Herzog et al. | 73/49.2 |
| 2005/0160077 | A1 * | 7/2005 | Howes | 707/2 |
| 2005/0192832 | A1 | 9/2005 | Call et al. | |
| 2006/0157142 | A1 | 7/2006 | Hillam et al. | |
| 2006/0157144 | A1 | 7/2006 | Hillam et al. | |
| 2006/0157145 | A1 | 7/2006 | Hillam et al. | |
| 2006/0157146 | A1 | 7/2006 | Hillam et al. | |
| 2006/0157147 | A1 | 7/2006 | Hillam et al. | |
| 2006/0157148 | A1 | 7/2006 | Hillam et al. | |
| 2006/0157149 | A1 | 7/2006 | Hillam et al. | |
| 2006/0157151 | A1 | 7/2006 | Memmott et al. | |
| 2006/0161374 | A1 | 7/2006 | Hillam et al. | |
| 2006/0175396 | A1 | 8/2006 | Call et al. | |
| 2007/0143062 | A1 | 6/2007 | Memmott et al. | |
| 2007/0143067 | A1 | 6/2007 | Hillam et al. | |

OTHER PUBLICATIONS

Preliminary Amendment A filed Feb. 8, 2007, cited in related application, U.S. Appl. No. 11/672,932 (Attached and referred to as Document 2).
Amendment B filed Nov. 28, 2007, cited in related application, U.S. Appl. No. 11/672,932 (Attached and referred to as Document 3).
Office Action mailed Feb. 12, 2008, cited in related application, U.S. Appl. No. 11/672,932 (Attached and referred to as Document 4).
Amendment C filed Apr. 14, 2008, cited in related application, U.S. Appl. No. 11/672,932 (Attached and referred to as Document 5).
Office Action mailed May 16, 2008, cited in related application, U.S. Appl. No. 11/672,932 (Attached and referred to as Document 6).
Office Action mailed Jan. 22, 2007, cited in related application, U.S. Appl. No. 11/062,121 (Attached and referred to as Document 7).
Amendment A filed May 21, 2007, cited in related application, U.S. Appl. No. 11/062,121 (Attached and referred to as Document 8).
Amendment B filed Nov. 26, 2007, cited in related application, U.S. Appl. No. 11/062,121 (Attached and referred to as Document 9).
Office Action mailed Dec. 31, 2007, cited in related application, U.S. Appl. No. 11/062,121 (Attached and referred to as Document 10).
Amendment C filed Mar. 31, 2008, cited in related application, U.S. Appl. No. 11/062,121 (Attached and referred to as Document 11).
Office Action mailed Apr. 22, 2008, cited in related application, U.S. Appl. No. 11/062,121 (Attached and referred to as Document 12).
Office Action mailed Jun. 6, 2006, cited in related application, U.S. Appl. No. 11/061,756 (Attached and referred to as Document 13).
Amendment A filed Sep. 22, 2006, cited in related application, U.S. Appl. No. 11/061,756 (Attached and referred to as Docuement 14).
Notice of Allowance mailed Oct. 4, 2006, cited in related application, U.S. Appl. No. 11/061,756 (Attached and referred to as Document 15).
Office Action mailed Sep. 19, 2006, cited in related application, U.S. Appl. No. 11/062,323 (Attached and referred to as Document 16).
Notice of Allowance mailed Oct. 4, 2006, cited in related application, U.S. Appl. No. 11/061,756 (Attached and referred to as Document 17).
Supplemental Notice of Allowance mailed Jan. 12, 2007, cited in related application, U.S. Appl. No. 11/061,756 (Attached and referred to as Document 18).
Office Action mailed Dec. 28, 2006, cited in related application, U.S. Appl. No. 11/062,120 (Attached and referred to as Document 19).
Amendment A filed Apr. 14, 2007, cited in related application, U.S. Appl. No. 11/062,120 (Attached and referred to as Document 20).
Amendment B filed Aug. 20, 2007, cited in related application, U.S. Appl. No. 11/062,120 (Attached and referred to as Document 21).
Amendment C filed Oct. 30, 2007, cited in related application, U.S. Appl. No. 11/062,120 (Attached and referred to as Document 22).
Notice of Allowance mailed Nov. 15, 2007, cited in related application, U.S. Appl. No. 11/062,120 (Attached and referred to as Document 23).
Amendment A filed Jan. 14, 2008, cited in related application, U.S. Appl. No. 11/676,507 (Attached and referred to as Document 24).
Office Action mailed Mar. 14, 2008, cited in related appliction, U.S. Appl. No. 11/676,507 (Attached and referred to as Document 25).
Amendment B filed May 13, 2008, cited in related application, U.S. Appl. No. 11/676,507 (Attached and referred to as Document 26).
Office Action mailed Jun. 5, 2006, cited in related application, U.S. Appl. No. 11/061,864 (Attached and referred to as Document 27).
Amendment A filed Sep. 22, 2006, cited in related U.S. Appl. No. 11/061,864 (Attached and referred to as Document 28).
Notice of Allowance mailed Oct. 4, 2006, cited in related application, U.S. Appl. No. 11/061,864 (Attached and referred to as Document 29).
Office Action mailed Apr. 17, 2006, cited in related U.S. Appl. No. 11/061,864 (Attached and referred to as Document 30).
Amendment A filed Sep. 11, 2006, cited in related U.S. Appl. No. 11/061,865 (Attached and referred to as Document 31).
Notice of Allowance mailed Sep. 26, 2006, cited in related application, U.S. Appl. No. 11/061,865 (Attached and referred to as Document 32).
Notice of Allowance mailed Sep. 28, 2006, cited in related application, U.S. Appl. No. 11/062,321 (Attached and referred to as Document 33).
Notice of Allowance mailed Nov. 28, 2006, cited in related application, U.S. Appl. No. 11/062,321 (Attached and referred to as Document 34).
Supplemental Notice of Allowance mailed Dec. 8, 2006, cited in related application, U.S. Appl. No. 11/062,321 (Attached and referred to as Document 35).
Supplemental Notice of Allowance mailed Jan. 23, 2007, cited in related application, U.S. Appl. No. 11/062,321 (Attached and referred to as Document 36).
Gimpel, D.J.; "A Tank Farm Data Reduction System"; IRE Transactions on Production Techniques; vol. 2, Issue 1; Apr. 1957; pp. 94-100 (Attached and referred to as "Document 1").
Office Action mailed Jun. 28, 2007, cited in related application, U.S. Appl. No. 11/672,932 (Attached and referred to as "Document 2").
Office Action mailed Jun. 26, 2007, cited in related application, U.S. Appl. No. 11/062,121 (Attached and referred to as "Document 3").

Office Action mailed Jun. 20, 2007, cited in related application, U.S. Appl. No. 11/062,120 (Attached and referred to as "Document 4").
Notice of Allowance mailed Aug. 31, 2007, cited in related application, U.S. Appl. No. 11/062,120 (Attached and referred to as "Document 5").
Office Action mailed Aug. 13, 2007, cited in related application, U.S. Appl. No. 11/672,932 (Attached and referred to as "Document 6").
Jim Bishop, *Competing Trends Fuel the Drive Toward Leak Detection Compliance*, National Petroleum News, vol. 88, No. 13, Dec. 1, 1996.
Phil Shook, *PC-Based Networks Provide Leak Detection Solutions*, National Petroleum News, vol. 88, No. 6, Jun. 1, 1996.
Joseph Tarnowski, *New Directions in Leak Detection*, Convenience Store News, Sep. 14, 1998.
Phil Shook, *Sorting Through the Methods*, National Petroleum News, vol. 86, No. 4, Apr. 1, 1994.
Office Action mailed Jul. 8, 2008, cited in U.S. Appl. No. 11/062,124 (Attached and referred to as Document 1).
Office Action mailed Jul. 9, 2008, cited in U.S. Appl. No. 11/062,122 (Attached and referred to as Document 2).
Office Action mailed Jul. 1, 2008, cited in U.S. Appl. No. 11/061,868 (Attached and referred to as Document 3).
Amendment D filed Aug. 22, 2008 in U.S. Appl. No. 11/062,121 (Attached and referred to as Document 5).
Amendment D filed May 16, 2008 in U.S. Appl. No. 11/672,932 (Attached and referred to as Document 6).
Advisory Action mailed Jun. 12, 2008, cited in U.S. Appl. No. 11/676,507 (Attached and referred to as Document 7).
Amendment C filed Aug. 5, 2008 in U.S. Appl. No. 11/676,507 (Attached and referred to as Document 8).
Office Action mailed Jan. 12, 2009, U.S. Appl. No. 11/062,124.
Notice of Allowance mailed Dec. 12, 2008, U.S. Appl. No. 11/062,121.
Notice of Allowance mailed Jan. 14, 2009, U.S. Appl. No. 11/062,122.
Notice of Allowance mailed Jan. 9, 2009, U.S. Appl. No. 11/061,868.
Office Action mailed Jan. 27, 2009, U.S. Appl. No. 11/676,507.
Notice of Allowance mailed Mar. 9, 2009, U.S. Appl. No. 11/672,932.
California Environmental Protection Agency, Vapor Recovery Test Procedure, Apr. 12, 1996, U.S.A.
Office Action mailed Oct. 17, 2008, cited in U.S. Appl. No. 11/676,507.
Notice of Allowance filed Sep. 22, 2008, cited in U.S. Appl. No. 11/672,932.
Advisory Action mailed Apr. 16, 2009, U.S. Appl. No. 11/676,507.
Notice of Allowance mailed Apr. 1, 2009, cited in U.S. Appl. No. 11/062,121.
Notice of Allowance mailed May 1, 2009, cited in U.S. Appl. No. 11/062,122.
Issue Notification mailed Apr. 29, 2009, cited in U.S. Appl. No. 11/062,121.
Issue Notification mailed May 20, 2009, cited in U.S. Appl. No. 11/062,122.
Notice of Allowance mailed Oct. 20, 2009, cited in U.S. Appl. No. 11/672,932 (3 pages).
Notice of Allowance mailed Feb. 5, 2010, cited in U.S. Appl. No. 11/676,507 (4 pages).
Office Action mailed Jun. 12, 2009, cited in U.S. Appl. No. 11/672,932.
Office Action mailed May 29, 2009, cited in U.S. Appl. No. 11/676,507.
Notice of Allowance mailed Sep. 30, 2009, cited in U.S. Appl. No. 11/676,507.
Issue Notification mailed Mar. 10, 2010, cited in U.S. Appl. No. 11/676,507 (1 page).

* cited by examiner

PERFORMING AN ON-DEMAND BOOK BALANCE TO PHYSICAL BALANCE RECONCILIATION PROCESS FOR LIQUID PRODUCT

CROSS-REFERENCE TO RELATED APPLICATIONS

This application claims priority to and the benefit of U.S. Provisional Patent Application Ser. No. 60/644,317, filed on Jan. 14, 2005, and entitled "Systems and Methods for Central Control, Monitoring, and Reconciliation of Liquid Product", which is incorporated herein by reference in its entirety.

BACKGROUND OF THE INVENTION

1. The Field of the Invention

Embodiments of the present invention extend to methods, systems and computer program products associated with the delivery, tracking, and reconciliation of liquid product inventory. More particularly, embodiments of the present invention provide for a liquid product book inventory to physical inventory reconciliation process that can be initiated and performed on a virtual real-time basis, regardless of ongoing sales transactions. Further, embodiments of the present invention are configured to measure and compensate for temperature variances at every point of physical measurement in order to appropriately reconcile book and physical inventory. In addition, embodiments of the present invention provide for an automated way to request, determine, and monitor the delivery of liquid product to a distribution facility in order to prevent shortages, unauthorized drops, theft, etc.

2. Background and Related Art

Both retail and wholesale liquid product distribution facilities (e.g., gas stations, oil refiners, etc.) are located throughout the nation and other parts of the world. Typically, the liquid product is stored in bulk storage containers or tanks, which may be located above, below, or partially below ground. Each tank may store various petroleum and other liquid products (e.g., gasoline, diesel, kerosene, etc.) to be dispensed through pump dispensers at various retail facilities (e.g., automobile service stations, trucking terminals, automobile rental outlets, and other similar operations). The liquid product is generally delivered to such retail facilities by a gravity drop from a compartment in a wheeled transport such as a fuel delivery truck. These delivery trucks are in turn loaded for delivery from tank systems located at wholesale distribution centers, which may also receive deliveries of product from, e.g., a pipeline spur, delivery trucks, a barge, rail car, or other similar means. The amount of the load is typically reported in a bill-of-lading, which is issued to the retail facility at the time of the drop.

In larger facilities, there may be multiple tanks containing the same or similar liquid product. In fact, tanks containing like or similar product may be manifolded together, allowing them to function as one larger tank. For example more than one tank containing LS #2 Diesel fuel may be plumbed to a common trunk line connecting to multiple fueling dispensers. Additionally, multiple tanks could be plumbed together with a siphon line allowing for the cross flow of product between the tanks. For instance, tanks with premium fuel may be manifolded together with regular fuel tanks, wherein midgrade fuels are a cross flow of these two types of fuel. For purposes of book inventory to physical inventory reconciliation, the multiple tanks that are plumbed together can be treated as one tank, since it is not always feasible to assign a sales transaction to any one of the tanks individually.

Regardless of the type of tanks, these distribution outlets (both wholesale and retail facilities) are tightly governed by Federal and state laws that require tank systems to have leak detection. One available leak detection processes is known as Statistical Inventory Reconciliation (SIR), which analyzes inventory, delivery, and dispensing data collected over a period of time to determine whether or not a tank system is leaking. Each operating day, the owner of the facility should measure the product level using a gauge stick or other tank level monitor (e.g., an Automatic Tank Gauge (ATG)). The owner is also required to keep complete records of all withdrawals from the tank and all deliveries to the tank. After data has been collected for the period of time required by the SIR, the data may be provided to the SIR vendor or entered into the owners own SIR program. The SIR system then uses sophisticated computer software to conduct a statistical analysis of the data to determine whether or not the tanks may be leaking. The program may then provide the owner with a test report of the analysis results with one of three possible bottom-line responses: pass, fail, or inconclusive.

Although current SIR systems are useful in detecting leaks and are approved by various governmental agencies (e.g., the Environmental Protection Agency EPA), they also have several shortcomings. For example, in order to use such SIR processes, measurements must take place in a static environment. In particular, no liquid product should be delivered to or dispensed from the tanks during the tank volume measuring process. For small retail facilities that typically have idle times (e.g., during early morning hours), this may not be a big burden. For larger operating facilities that have continual activity (e.g., popular truck fueling stations), however, such required inactivity of the dispensers causes a great burden on the owner and is a big inconvenience for customers who must wait while the measurements are taking place.

Another problem with such SIR systems is they cannot provide real-time monitoring of the delivery of liquid product for accurate inventory. Frequently, there may be overages and shortages in the delivery of the liquid product as opposed to what gets reported in the bill-of-lading. These delivery inconsistencies may be caused by any number of things, for example, inaccurate metering at the rack where the fuel is dispensed into the delivery truck, inconsistencies in the delivery truck's tank not allowing all of the fuel to drop, a bad release valve on the delivery truck, temperature changes from the rack to the tank where it's delivered, and even theft. Regardless of the reason for the inconsistency, as mentioned above because these SIR systems typically require data taken over a large period of time (e.g., a month), they cannot immediately identify overages or shortages in deliveries by taking instant reconciliations before and after a delivery. Nevertheless, even if they could do a real-time reconciliation, because they cannot operate in a dynamic environment, they cannot give on-demand reconciliation when pumps are active. Accordingly, in order to use SIR for determining delivery shortages, deliveries would need to be made during idle times, which could be difficult, if not impossible, to schedule.

A related problem with current SIR systems is that, because they cannot do real-time monitoring of the change in volume within a tank, they cannot immediately determine if liquid product is being dropped into an unauthorized tank or if the level of water within the tank is too high. An unauthorized drop, however, can have serious consequences. For example, if the wrong petroleum product is unknowingly dropped into an improper tank, extreme damage may occur to vehicles fueled with the improper product. In addition, during a drop, the sediment at the bottom of the tank may be disturbed causing the level of water within the tank to rise dramatically. Such a rise in water volume, however, can also be siphoned into the dispensing system, causing those vehicles fueling during the surge to get water instead of fuel.

One solution to such problems would be to manually monitor the drop through, e.g., an ATG. This rudimentary solution, however, has several downfalls. For example, often times a drop cannot be anticipated; and therefore one might not even know when an unauthorized drop has occurred. In addition, by the time it is determined that the unauthorized drop is occurring or that the level of water in the tank is rising to dangerous levels, it may take several minutes to run out and stop the unauthorized or dangerous drop, while the damage has already occurred.

Another problem with SIR reports is that they don't take into account temperature differences at every physical point in the distribution process. When the liquid product is initially loaded into the delivery vehicle, it is at a first temperature that can be reported in the bill-of-lading. Depending on a myriad of factors, however, the temperature of the liquid product can change dramatically during the distribution process. For example, the temperature of the liquid product may change depending on the temperature difference where the delivery truck was loaded and where the drop was made, the time of day, whether the tank is above or below ground, etc. These temperature differences, however, can have an enormous effect of the measured volume of the liquid product and can be the cause of error in the SIR system.

SUMMARY OF THE EMBODIMENTS

Embodiments of the present inventions overcome these problems by providing various methods, systems, computer program products and devices. In one configuration, the present invention can include systems and methods for the central control and monitoring of product delivery based on anticipation of delivery through a request and authorization of product drop process. Prior to delivery of a product, the driver requests and receives authorization from a centralized service, such as a corporate based Centralized Inventory Management system, or CIM, sending authorization data to the driver and/or the retail facility to receive the liquid product. The driver can provide the CIM with information on a bill-of-lading. The driver can also provide additional information such as the supplier, the fuel source where the product was loaded, the carrier, driver's information, etc. In some embodiments, the driver can provide all of this information electronically using a portable computing device carried by the driver or located in the truck to wirelessly communicate this data between the terminal, the CIM, and/or the retail facility. The CIM can authorize delivery following a series of appropriate interactions between the fuel source, the CIM, the carrier, the driver and the retail facility where the delivery or drop will occur. As part of the anticipation of a drop, the specific tank to receive the product can be identified and flagged. That particular tank, as well as all other tanks at the retail facility, can be monitored to determine in real-time if the drop occurs at the proper tank. Further, monitoring of water content can occur to prevent delivery of the water to the customer through the dispenser.

In one configuration, disclosed are systems, methods, and computer program products for the central control and monitoring of a delivery of liquid product. The system can include a centralized inventory management system that can monitor and control the delivery of the liquid product by a carrier, to at least one retail facility. The method can include receiving at the centralized inventory management system a request from the carrier for instructions relating to delivery of liquid product. Based on data monitored by the centralized inventory management system, the method can include determining a type and volume of liquid product needed in one retail facility selected from a plurality of retail facilities and then posting an order providing instructions to the carrier regarding liquid product needed in the selected retail facility.

In another configuration, disclosed are methods, systems, and computer program products to prevent a delivery vehicle from making an unauthorized delivery of liquid product to a liquid product storage tank at a retail facility. The method can include a retail system and/or a centralized inventory management system monitoring one or more tanks at the retail facility for liquid product delivery by the carrier. A retail system and/or the centralized inventory management system monitors the delivery, the method can include identifying delivery of liquid product to an unauthorized tank and then automatically terminating delivery of the liquid product by interrupting delivery of the liquid product into the unauthorized tank.

The system to prevent a delivery vehicle from delivering liquid product to an unauthorized storage tank can include a centralized inventory management system connected to at least one a computer in the retail facility. The system also can include at least one sensor located in each storage tank at the retail facility, the at least one sensor can be electronically connected to the centralized inventory management system and can perform a real-time measurement of the amount of liquid product in each of the storage tanks. The centralized management system and/or the retail facility can activate a valve that can interrupt the flow of liquid product during a delivery. The centralized inventory management system can monitor the sensor in each of the storage tanks while liquid product is being delivered into any storage tank and can send a signal to the delivery vehicle to close the valve if the liquid product is being delivered into an unauthorized tank or a level of water increases, thereby indicating that too much water is in or being deposited into the tank.

In another configuration, disclosed is a virtual real-time liquid product book to physical reconciliation process within a dynamic environment. The method can include receiving a request to perform a liquid product book to physical reconciliation process for one or more storage tanks. Once received, the method can include identifying the status of one or more liquid product dispensers corresponding to the one or more storage tanks. While the one or more liquid product dispensers are in an active state, the method can include taking a plurality of measurements within the one or more storage tanks and the one or more liquid product dispensers and, based on the plurality of measurements, automatically performing the liquid product book to physical reconciliation process.

In another example embodiment is disclosed a system, method, and computer program product for performing a virtual real-time liquid product book to physical volume reconciliation by rapidly accumulating data over a predetermined time period at a plurality of measurement devices and monitoring sale transactions during the predetermined time period. This embodiment comprises receiving a request to initiate a liquid product book to physical volume reconciliation process for one or more storage tanks. The request is received while one or more liquid product dispensers, corresponding to the one or more storage tanks, are in an active state. Thereafter, a plurality of measurement data from a plurality of measurement devices is collected over a predetermined period of time, wherein the plurality of measurement data is taken at rapid intervals over the predetermined period of time. Further, a time-stamp is assigned to each of the plurality of measurement data and sales transactions are monitored during the predetermined period of time. After the predetermined period of time, the plurality of measurement data and the monitored sales transactions are used to complete the liquid product book to physical volume reconciliation process.

In another configuration, disclosed are systems, methods, and computer program products to compensate for surface movement of liquid product within one or more tanks during a virtual real-time liquid product book to physical reconciliation process. The method can include filtering physical volume measurements within one or more tanks at a point in time by receiving a plurality of measurement data at a plurality of times, each measurement data representing a volume of liquid product within the tank. With the plurality of measurement data, the method can include comparing each volume of liquid against at least one predetermined volume identified as being unreliable and generating a second set of measurement data by eliminating any measurement data from the plurality of measurement data that is identified as being unreliable. Using the second set of measurement data, the method can include determining a sample mean and a standard deviation for the second set of measurement data and then filtering the second set of measurement data to generate a third set of measurement data by eliminating any measurement data from the second set of measurement data that has a value plus or minus a predetermined number of the standard deviations from the standard mean for the second set of measurement data.

In another configuration, disclosed are methods, systems, and computer program products for monitoring and reporting liquid product dispenser transaction states for book to physical reconciliation purposes. This embodiment can provide real-time status of sales transactions in order to perform liquid product fuel reconciliation regardless of ongoing sales. The process can include receiving a request to perform the liquid product book to physical reconciliation for one or more of storage tanks. Once the request is received, a duration for accumulation of measurement data used for the reconciliation is identified. During the identified duration, the status of one or more dispensers that dispense liquid product from one or more storage tanks is monitored. Based on the status of the one or more dispensers, either a physical inventory or a book value is updated to appropriately determine the book to physical reconciliation.

In another configuration, disclosed are methods, systems, and computer program products for collecting and communicating temperature and volume data directly from a dispenser for use during a book to physical reconciliation process. The temperature and volume readings, such as data indicative of the measured temperature and volume of the liquid product, can be received directly from a dispenser by at least one of a retail system and a central inventory management system. The method can include collecting flow data indicative of a volume of a liquid product dispensed from the dispenser at a plurality of times during a defined time interval and collecting temperature data indicative of a temperature of the liquid product dispensed from the dispenser at the plurality of times during the defined interval. Once collected, the temperature data and the flow data can be transmitted to at least one of a retail system and a centralized inventory management system.

In another configuration, disclosed is a device for collecting liquid product volume data at a dispenser. The dispenser can include a first totalizer that receives signals from a pulser. A second totalizer can be connected or linked in parallel with the first totalizer and can receive signals from the pulser. The dispenser further includes a data acquisition unit in signal communication with at least the second totalizer. The data acquisition unit receives data from the second totalizer that is indicative of a volume of the liquid product dispensed from the dispenser.

The method for collecting liquid product data at a dispenser can include receiving a plurality of pulses at a first totalizer within the dispenser. Upon receiving pulse data or signals from the first pulser at a second dedicated totalizer within the dispenser, the method can further include generating data indicative of a volume, of liquid product flowing from the dispenser. Following generating the data, the method can include sending the data corresponding to the dedicated totalizer to at least one of a retail system and a centralized inventory management system.

In another configuration, disclosed are methods, systems, and computer program products for performing an on-demand book balance to physical balance reconciliation process for liquid product. The method can include receiving an indication that a delivery of product is about to occur at a retail facility. Based on the received indication, the system can automatically initiate a first book balance to physical balance reconciliation of one or more liquid product storage tanks at the retail facility prior to receiving a delivery of liquid product. This reconciliation can be performed while fuel is dispensed from the one or more storage tanks. Following completion of the first book balance to physical balance reconciliation, the method can include delivering an amount of liquid product as indicated on a delivery document. Upon receiving an indication that the amount of liquid product has been delivered, the method can include automatically performing a second book balance to physical balance reconciliation process to identify one or more discrepancies between the book amount of liquid product and a physical amount of liquid product actually delivered to the one or more storage tanks.

In another configuration, disclosed are methods, systems, and computer program products for performing temperature standardization of the volume of a liquid product at one or more points of physical measurement. The system can include a plurality of volume measurement devices. At least one volume measurement device is located at each of (i) a fuel source located with a distributor, (ii) a storage tank at a retail facility, and (ii) a dispenser that delivers the liquid product to the consumer. Each volume measurement device measures a gross volume of the liquid product at, respectively, the distributor fuel source, the retail facility storage tank, and the dispenser and generates volume data indicative of the gross volume. The system also includes a plurality of temperature measurement devices. At least one temperature measurement device is located at each of (i) the distributor fuel source, (ii) the retail facility storage tank, and (iii) the dispenser. Each temperature measurement device measures a temperature of the liquid product at, respectively, the distributor fuel source, the retail facility storage tank, and the dispenser, and generates temperature data indicative of the temperature. A plurality of time-stamp systems can also be included in the system. In one embodiment, at least one time-stamp system is located at each of (i) the retail facility storage tank and (ii) the dispenser. Each time-stamp system allocates a time-stamp to each of the volume data and the temperature data generated at, respectively, the retail facility storage tank and the dispenser.

In another configuration, disclosed is a method of standardizing a volume of a liquid product across a fuel management system. The method can include measuring a gross volume and a temperature of the liquid product at each of a fuel source located at a distributor, a storage tank at a retail facility and a dispenser at the retail facility. Following measuring the gross volume and temperature, the method can include assigning a time-stamp to data indicative of the temperature and gross volume in the tank and at the dispenser. The method can also entail using the measurements of gross volume, temperature and each of the given time-stamps to reconcile gross to net volumes at a single point in time.

In another configuration, disclosed are methods, systems, and computer program products for balancing net inventory using a dynamic expansion coefficient of liquid product relative to the temperature changes with density. The method can include receiving an American Petroleum Institute (API) gravity report that includes a measurement of a specific gravity and a temperature of the liquid product reported at a fuel source. Utilizing the API gravity report, the method can include maintaining correct densities of the liquid product by utilizing a plurality of expansion coefficients to dynamically convert a gross volume measurement to a net volume measurement for transactions of liquid product in a tank and at a dispenser in order to maintain a net perpetual book balance.

In another configuration, disclosed are methods, systems, and computer program products for measuring a physical volume of a liquid product in a manifold set of tanks. The method can include identifying three or more volume book balances of the volume of the liquid product in the manifold set of tanks at three or more reconciliation times. The amounts of the liquid product dispensed from the manifold set of tanks can be monitored and the physical volume of the liquid product in each tank of the manifold set of tanks measured at the three or more reconciliation times. With this data, variance data indicative of a difference between the physical volume and the three or more volume book balances can be calculated and data for use in determining the volume of the liquid product in the manifold set of tanks, based upon a measured height of the liquid product in the manifold set of tanks, can be generated. A relationship between three or more data points representative of the variance data can be generated and used to calibrate the manifold set of tanks.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE EMBODIMENTS

Embodiments of the present invention extend to methods, systems, and computer program products associated with the delivery, tracking, and reconciliation of liquid and non-liquid product inventory. The embodiments can include or use one or more special purpose or general-purpose computers, including various computer hardware, as discussed in greater detail below with respect to FIG. 13.

Embodiments of the present invention generally relate to methods, systems, and computer program products for liquid product inventory reconciliation between the physical measurements of the product stored in storage tanks when compared to the amount of product sold (i.e., pumped out of the storage tanks) and the amount of product delivered (i.e., pumped or otherwise delivered to the storage tank) as recorded on the books of the retail facility and/or corporate offices; i.e., the book balance or inventory. Additional embodiments of the present invention relate to methods, systems, and computer program products for documenting and controlling the flow of liquid product from a wholesale distribution storage unit to the retail facility and, ultimately, to the individual consumer. Although the following description of the embodiments of the present invention will typically refer to petroleum fuels as the liquid product, the following embodiments are also applicable to other liquid and non-liquid products for which reconciliation between the physical product and the book balance is desired. Accordingly, the following discussion referencing petroleum products or other specific products for reconciliation is used for illustrative purposes only and it is not meant to limit or otherwise narrow the scope of the present invention unless otherwise explicitly claimed.

Initially described herein is a system and method for the central control and monitoring of product delivery placement based on an anticipation of delivery through a request and authorization process. This load/delivery authorization process provides for an aggregate procurement control with a centralized inventory management system that is capable of identifying irregularities in a real-time manner in order to immediately rectify such irregularities.

Following the discussion of this system, certain aspects of the retail facility associated with the system will be described. In addition, descriptions of various additional systems, methods, and computer program products related to the tracking and reconciliation of liquid fuel inventory throughout the exemplary system will be provided.

Figure 1:
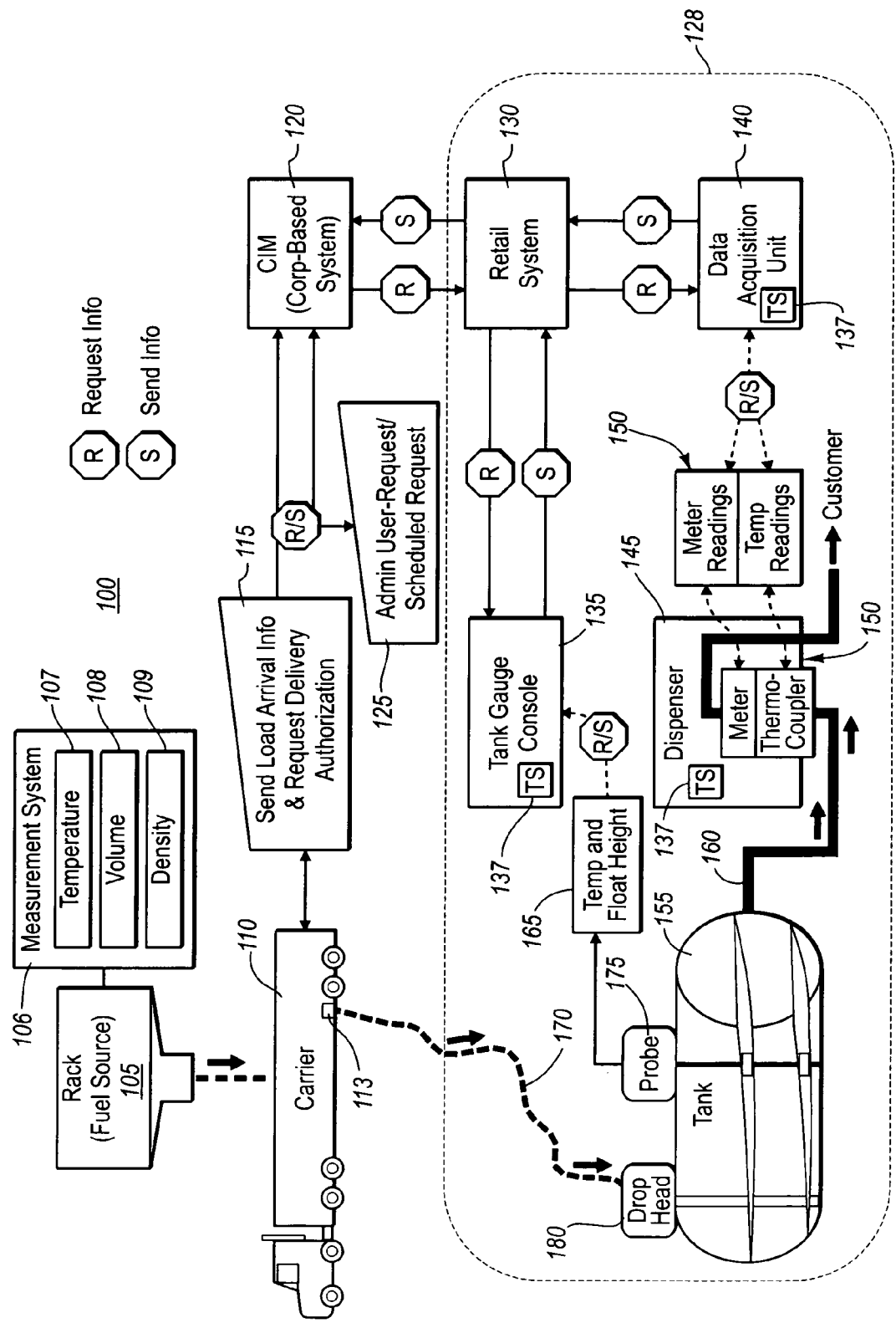
FIG. 1 illustrates a general overview of a system for the delivery, tracking, and reconciliation of liquid product inventory according to one embodiment of the present invention.
Figure 2:
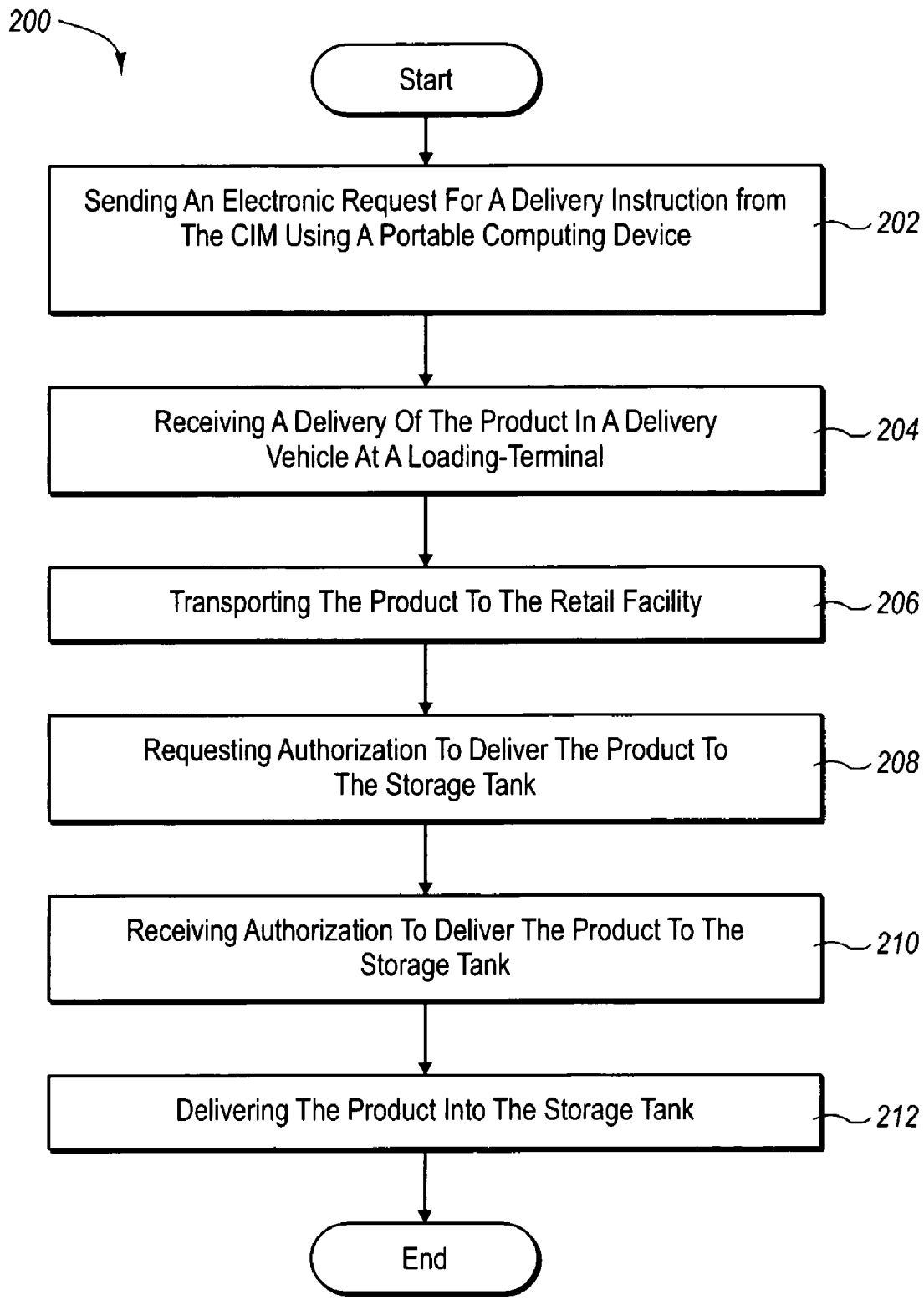
FIG. 2 illustrates a flowchart of one method of implementing example embodiments of the present invention.

The following discussion will refer to both FIG. 1 and FIG. 2. Turning now to FIG. 1, schematically illustrated is a system 100 usable for the delivery, tracking, and reconciliation of liquid and non-liquid product inventory. Generally, the methods, systems, devices, and computer program products of the present invention can track, monitor, and measure the temperature, volume, and/or density of the fuel at numerous points within the system 100, and perform a reconciliation process using the tracked, monitored, and measured temperatures, volumes, and/or densities. By tracking these various temperatures, volumes, and/or densities measured data can be corrected or adjusted to bring measured volumes into net terms, i.e., adjusting for the change in temperature of the liquid product through the delivery process. This can minimize the effect that temperature change can have on variances in the reconciliation process.

FIG. 2 illustrates one embodiment of a method 180 that implements one process for using system 100. The system illustratively represents the processes and methods for supplying a liquid product to a carrier from a fuel source or rack (i.e. a wholesale distribution storage unit), delivering the liquid product to a retail facility, and dispensing the liquid product into a consumer's vehicle or other container.

In the system illustrated in FIG. 1, a fuel source, referred to as a "rack" 105, contains a quantity of liquid product. The rack 105 includes or can be connected to a computerized system that communicates with a corporate based or centralized inventory management (CIM) system 120. The rack 105 can include a measurement system 106. Measurement system 106 can include devices to measure, by way of example and not limitation, a product temperature device 107 to measure liquid product temperature, a product dispensed volume device 108 to measure liquid product volume, and a product density device 109 to measure liquid product density. Each of these measurements can be communicated back to the CIM 120 using a variety of different communication techniques and technologies. For instance, wireless or wired connections, including combinations of the same, can be used to communicate the data between the measurement devise and the CIM 120. The wireless connection can include using any type of electromagnetic radiation to propagate data or signals between the measurement devise and the CIM 120. The connections can utilize the Internet, local area networks, wide area networks, and associated hardware and software to enable deliver of signals and/or data between the measurement devise and the CIM 120.

The CIM system 120, in turn, can be connected to one or more retail systems 130, located at one or more retail facilities or sites 128, which form part of a computer system used to operate or control a retail fuel center or any other facility that includes one or more product storage tanks 155. Each of the CIM system 120 and the retail system(s) 130 can include one or more computers capable of storing, transmitting and/or processing various types of data. Exemplary computers are described in more detail with reference to FIG. 13. The data transmitted and received by these computers can include any specific measurements of the various information used to form the inventive systems described herein. By way of example and not limitation, this information can include measurements of fuel volume, temperature, density, the time of the measurements, and any other type of information that can be useful to make the calculations described below.

In some embodiments, the CIM system 120 can be connected to dozens of individual retail systems 130, each having unique and time specific needs for fuel deliveries. The CIM system 120 is one example of a centralized station that can be used to monitor and control the movement of liquid product, as described in more detail below. Likewise, the CIM system 120 can be one example of a fuel management system used and described as part of the inventive systems and methods discussed below.

As illustrated in FIG. 1, the retail system 130 can communicate with and optionally control various other components or devices that are located at the retail facility 128 where the retail system 130 is located. For instance, the retail facility 128 can include one or more tanks 155, only one being illustrated, to hold quantities of liquid product. These tanks 155 can receive fuel from the carrier 110 through a drop head 180 and deliver fuel to a dispenser 145, for delivery to a consumer of the retail facility 128, by way of a pickup tube 160.

To obtain accurate accounting of the quantities of fuel within the one or more tanks 155, various different sensors, meters, and systems can identify (i) the height of fuel within a tank, (ii) the temperature of fuel within a tank, (iii) the volume or flow rate of fuel out of the tank, (iv) the temperature of fuel flowing out of the tank, and (v) one or more timestamps when measurements were taken and the data generated. Additionally, sensors, meters, and systems can be used to track other characteristics of properties or the fuel, including, but not limited to, the specific gravity of the fuel, the density of the fuel, etc.

In FIG. 1, the volume of fuel within tanks 155 can be measured and tracked using a tank probe 175 that delivers signals or data representative of heights and temperatures of fuel 165 to a tank gauge console 135 and so to the retail system 130. The tank probe 175 can be or cooperate with a thermistor or thermistor probe that senses the temperature of the fuel, air, and water within the tank 155. The tank gauge console 135, and optionally the tank probe 175 and/or the retail system 130, can include a time-stamp system 137 that can assign times to the signals and data. A clock is one example of a time-stamp system, but others are known to those skilled in the art.

It will be understood that one or more of the consoles, probes, and systems can be incorporated into a single device that performs the desired functions of the console, probe, and system. Furthermore, it will be understood that, with alternate technologies available, the volume can be determined through methods other than the sensing of the height of the fluid. In other embodiments, the probe 175 can also include device to measure the density of the product in the tank 155.

To aid in tracking the movement of fuel at the retail facility 128, sensors, meters, and systems are also provided at the dispenser 145. These sensors, meters, and systems track the flow and temperature of fuel as it is delivered from the dispenser 145 to a consumer of the retail facility 128. Readings or data 150 from the flow meter and the temperature sensor, i.e., thermocouple, can be delivered to a data acquisition unit 140 for storage and subsequent delivery to the retail system 130 as needed. Optionally, the data acquisition unit 140 can include another time-stamp system 137 that assigns time values to the data, or groups of data, generated by sensors, meters, and systems of the dispenser 145. Additional discussion of the sensors, meters, and systems, and the associated measurement data, will be described in greater detail hereinafter.

With continued reference to FIGS. 1 and 2, a driver or carrier 110 can request delivery instructions or a supply option to deliver to a branch or retail operator, such as the retail facility 128 associated with the retail system 130, as represented by block 202. The carrier 110 can request such an instruction from the CIM system 120 using a portable or other type of computing device having computer-executable instructions and/or computer-readable media, for example. Specific details concerning such a portable computing device are discussed below with reference to the computer of FIG. 13.

The CIM system 120 can evaluate or monitor data and reference the most economical order feasible for a particular retail operator or branch, using a cost-minimizing, linearly constrained optimization processes that considers, among other things, the relative cost of delivered supply options, supply purchase fulfillment obligations, and/or retail demand constraints. For example, because the CIM system 120 is capable of monitoring the needs of several retail systems 130, i.e., tracking the inventory at one or more retail systems 130, the CIM system 120 can determine those retail facilities 128 that are in greater need of fuel product relative to other retail facilities 128. In addition, the CIM system 120 can take other factors into consideration by monitoring other data, such as the geographical location of the carrier 110 relative to a rack 105 where the product can be loaded, as well as the relative geographic relationship between the carrier 110, the rack 105 and the retail facility and its associated retail system 130.

Upon taking these and other factors into consideration, and as part of the request represented by block 202, the CIM system 120 can post an order with an order number to the carrier 110 and to the referenced rack 105. The carrier 110 can then accept or reject the order, such as rejecting the order with a reason code indicative of the reason for the rejection. For instance, the carrier 110 can request the supply option from a computing device via, e.g., the Internet, and the CIM system 120 can post the order back to the driver and rack simultaneously via a similar automated computing network. Alternatively, the carrier 110 can reject the order by sending numerical, textual or other codes representative of the reason for the inability of the carrier 110 to accept the order. For instance, the carrier 110 can reject the order in the event that a truck may have developed a maintenance problem requiring immediate attention, so that the carrier 110 cannot make an immediate pick up. Other reasons can include, by way of example and not limitation, the supplier is out of fuel, the terminal is out of fuel, the terminal is below a minimum amount of fuel, the customer credit limit at the facility has been exceeded, the supplier allocation has been exceeded, there is insufficient time for the driver to make the delivery, or the driver or delivery vehicle are not authorized to receive deliveries at the facility.

Of course, accepting and rejecting the order can include an automated procedure performed through various mediums, e.g., wireless communications such as infrared, or radio frequency communication. Further, this type of communication can utilize hardwired direct connections. Accordingly, the use of the Internet for relaying information in this embodiment and subsequent embodiments is for illustrative purposes only and it is not meant to limit or otherwise narrow the scope of the present invention unless otherwise explicitly claimed. It should be noted that any of the computer related communication processes described herein can utilize similar automated processes. Accordingly, although a particular automated process may or may not be referenced in the following examples and description, it should be understood that the methods, systems, and computer program products described herein can utilize any of the above described mediums and any other well know means to communicate and practice the various processes described herein.

In the system described above, it can be generally assumed that there are one or more computers at each of the rack 105, the carrier 110 and/or the driver, the CIM system 120, and the retail system 130, all of which have the capability to at least communicate with one or more of the disclosed systems using wired or wireless technologies, such as, but not limited to, Internet, wireless, infrared, RF communications, etc. Further, each of the components used to measure temperature, tank volume, flow rate, etc., time-stamp the data, and perform the reconciliation processes can utilize or include one or more computer components. General details concerning the types of computer or computer systems that can be used are discussed below with reference to FIG. 13.

With continued reference to FIGS. 1 and 2, when the carrier 110 accepts (or possibly even rejects) the order, the CIM system 120 can update the status of the order and forward ordering details to the loading terminal or rack 105. In the event that the carrier 110 accepts the order, the carrier 110 can arrive at the loading terminal or rack 105, and reference the order with the order number previously received from the CIM system 120. The loading terminal or rack 105 references the order detail via the order number and authorizes constrained loading for the carrier 110 in accordance with the order detail received from the CIM system 120. The carrier 110 can then receive delivery of the product in a delivery vehicle, as represented by block 204 of FIG. 2. Once the product is loaded into the delivery vehicle, a computer located at the rack 105 or loading terminal can forward an electronic transaction record (ETR) to the CIM system 120 such as, a corporate dispatch/central ordering system of the CIM system 120, thereby altering and updating the CIM system 120 with data indicative of the completion of the load.

At this time, the carrier 110 can receive a paper bill-of-lading (BOL) from the loading terminal or rack 105 that may subsequently be used to appropriately and accurately update the liquid product inventory book balance during the liquid product reconciliation process. The paper BOL is required under Department of Transportation rules to be available for inspection in vehicles transporting commercial cargo on U.S. highways. It is understood that exemplary embodiments of the present invention do not require the use of paper during any phase of the operation. The embodiments of the present invention can be fully and completely automated, thus allowing for all information to be passed back and forth between the various entities completely electronically. The BOL information can be substantially similar to the information contained in the ETR, which can include some or all of the information discussed below in appropriate data fields. In some embodiments, the ETR can also be sent to the carrier 110, for automated forwarding to the retail system 130 upon arrival at the delivery site.

The BOL/ETR can include the route start and end time, a freight bill number and a truck and trailer(s) number(s) as appropriate. Further, the BOL can include the customer name and customer ID, the supplier name and supplier ID, the ship from name and ship from ID and ship to name and the ship to ID. Additionally, the BOL can include a date, a start and end time and/or a wait time. This BOL can also include the supplier BOL product name, product ID, the gross volume, the net volume as a function of temperature, the specific gravity of the product, and the density of the product. Moreover, the BOL can include the BOL volume unit of measure (UOM), the density UOM, the temperature and the temperature UOM, the product name and the product ID. Other information can also be included on the BOL as appropriate or desired.

Once a load of fuel is received, the carrier 110 can then transport the product in the delivery vehicle to the retail facility, as represented by block 206 in FIG. 2. Upon arriving at the appropriate retail facility, the carrier 110 can request a delivery authorization 115 by sending load arrival information to the CIM system 120, which can then forward the information to the retail system 130, as represented by block 208 in FIG. 2. Alternatively, the delivery authorization 115 can be sent directly to the retail system 130, which in turn forwards the information to the CIM system 120. In either case, at this stage, the driver can provide the retail system 130 with information from the BOL, e.g., the product type, density, temperature of the product at the rack 105, gross gallons, temperature corrected gallons, i.e., net gallons, etc. In some embodiments, this information can be provided by the driver 110 to the retail system 130 or the CIM system 120 using automated systems, such as, but not limited to, wireless transmission of the ETR to one or both of the retail system 130 and the CIM system 120. Since the CIM system 120 has alerted the retail site and its associated retail system 130 that an inbound carrier is coming, the carrier 110 need only pull into the parking lot and electronically transmit the ETR data to the retail system 130. This saves a great deal of time over the current manual methods, and further decreases the chance of human error.

It should be noted that the ETR/BOL can also be used to generate various accounting reports and/or journal entries within the CIM system 120, the retail system 130, with the carrier 110, and/or with the fuel supplier who controls the rack 105. For example, when the driver delivers the load, an entry can be made reflecting an account payable to both the carrier 110 and the fuel supplier from the retail outlet. The carrier 110 can generate an entry reflecting an account payable to the driver and an account receivable from the retail outlet. The supplier can also generate an entry reflecting an account receivable from the retail outlet. The carrier 110 can also provide additional information on the BOL such as the supplier, the terminal where the product was loaded or the rack location 105, the carrier 110 or driver information, etc.

Upon appropriate interactions between one or more of the rack 105, the CIM system 120, the carrier 110, and the retail system 130 that is associated with the facility or retail operator where the delivery of fuel or "drop" 170 will occur, the CIM system 120 can grant authorization for the delivery. These interactions can include a number of different steps. For example, the retail system 130 can verify that the product type and product volume match the requirements for a storage tank 155 designated to receive the drop 170. If this is not the case, a different storage tank can be identified to receive the drop 170. The CIM system 120 can then reference the tank manifolds containing product matching the transaction record and indicate an appropriate tank 155 into which the carrier 110 is to make the drop 170. The driver can then proceed to the designated storage tank fill connection and begin making the various connections required to physically deliver the product from the delivery vehicle into the storage tank. However, the driver does not actually begin the delivery process until he receives specific authorization.

Prior to giving the authorization to begin the physical product delivery process, exemplary embodiments of the present invention provide for a process for reconciling the liquid product book balance and records at the CIM system 120 to the physical quantity of liquid at the retail facility 128 available for sale. As will be described in greater detail below, and unlike prior systems, this reconciliation process can be done in a virtual real-time system even during the dispensing of liquid product out of the tank 155 and/or other tanks at the retail facility 128. Of course, such reconciliation can also be done while the retail system 130 is static. It will also be understood that obtaining the measurement data can be performed in real-time, while the reconciliation process is performed in a virtual real-time. Accordingly, the use of the system as described herein in performing the reconciliation process at specific intervals is used for illustrative purpose only and is not meant to limit or otherwise narrow the scope of the present invention unless explicitly claimed.

In any event, some embodiments provide an inventory measuring probe 175 utilized to make the actual measurements of the height of the fuel in the tank, or in some embodiments, the actual volume in the tank. These height measurements can be converted to specific volume measurements, as discussed below in much greater detail. In some embodiments, tank probe 175 provides a measure of both the fuel level and the water level within the tank. In still other embodiments, probe 175 also provides a measurement of the specific gravity or the density of the fuel and/or the fuel temperature. In large volume facilities, this process can be repeated for every delivery that occurs during the day. Additionally, and as described in greater detail below, a snapshot of the fuel level in the tank can be taken on-demand. In any event, after performing the book to physical reconciliation, the system 100 can then post the transaction record to the driver for validation, whereupon the carrier 110 validates the transaction record and the CIM system 120 posts an authorization to the driver to drop the fuel, as represented by block 210 in FIG. 2.

With this authorization, the carrier 110 then begins the delivery of the product into the designated tank(s) 155, as represented by block 212 in FIG. 2. During product delivery, the CIM system 120 and the retail system 130 can monitor the flow rate of fuel into the tank 155 as the fuel passes from the delivery vehicle of the carrier 110, through linking piping, conduits, and manifolds, before the fuel is delivered into the tank 155. For example, the systems 120 and/or 130 can monitor the drop to the tank 155 by specifically monitoring the fuel height in the designated storage tank 155, in order to insure that the appropriate liquid product is dropped or delivered into the appropriate tank 155. This can be a function of the flow rate from the dispensers relative to the height of product in the tank 155. More specifically, because the flow rate through the dispenser can be greater than the flow rate of the drop from the carrier 110 into the tank 155, this embodiment of the present invention can compensate and still recognize into which tank the carrier 110 is making the drop. If it is recognized that the carrier 110 is dropping in an unauthorized tank, then the appropriate action can be taken. For example, exemplary embodiments provide that as the CIM system 120 or the retail system 130, as the case may be, monitor the various tanks and identify that an unauthorized drop is occurring, the CIM system 120 can indicate an improper drop to the retail system 130. The retail system 130 can then initiate an alarm, or in some embodiments, a lock down of the delivery vehicle control valve 113 to interrupt the flow into the wrong tank. In other words, exemplary embodiments provide for the ability for a signal to be transmitted from the retail system 130 to the carrier 110 during an improper drop, which triggers a solenoid that will automatically shut down the fuel valve 113 in the truck and stop the drop in order to mitigate cross-contamination. The solenoid valve 113 can be initiated as its control module (not shown) communicates electronically via RF, WiFi, or other wireless methods to the CIM 120 or to the retail system 130. In some embodiments, the solenoid valve 113 can be opened automatically when the delivery authorization is granted and received by the carrier 110 delivering the load of fuel.

This same shut down process can be used when a sensor in the tank indicates to the retail system 130 that intermixing of fuels is occurring or about to occur. For instance, the system 130 can automatically or manually initiate a shutoff process that can prevent fuel intermixing, e.g., that prevents diesel fuel from being dropped into a gasoline storage tank, or vice versa.

In addition to monitoring fuel delivery, the sensors within each tank can monitor the height of water in each tank. Float heights of both the fuel and water floats can be monitored such that if the water content in the tank is too high, thereby causing a risk that liquid product being pumped out of the dispensers 145 contain a high water content, then the CIM system 120, (or the retail system 130 itself, as the case may be) can relay to the retail system 130 such information. The dispensers 145 can then also be shut down in a similar fashion as that of the carrier 110, to mitigate any damage to the customer's vehicle. In yet other embodiments, if the drop process is stopped due to high water content, the retail system 130 can automatically begin draining some of the water from the tank 155. As water vapor routinely condenses inside the tank 155, this process is done on a periodic basis regardless of the drop schedule. In other words, as part of the anticipation of a drop, a specific tank to receive a product can be identified and flagged. That particular tank, as well as all other tanks at the facility, can be monitored to determine in real-time if the drop occurs at the proper tank.

Upon drop completion, the carrier 110 or driver can notify the CIM system 120, where upon the CIM system 120 updates its central book balance as per the loading transaction record received from the rack 105 and confirmed by the carrier 110. Thereafter, the CIM system 120 performs another book to physical reconciliation process, optionally accounting for volume differences due to temperature and density of the product.

Once reconciliation is complete, the CIM system 120 can then generate a real-time exception report of various types and post it to the appropriate users. In other words, exemplary embodiments provide for the reconciliation at the beginning and ending period of a delivery. This allows the system, among other things, to automatically determine if the full amount of the load (as indicated in the BOL and loading ETR) was delivered. If not, the driver and/or drop or retail system or facility can be immediately notified of the irregularity and the appropriate action can be taken.

For example, if the second reconciliation process indicates that the full amount of product has not been received, the various connections can be checked to ensure appropriate air ventilation into the delivery vehicle to effectuate emptying of the delivery vehicle. A visual inspection of the delivery vehicle can also be conducted to ensure that the entire load has been dropped. It is possible that the driver might verify that the load has been completely delivered into the tank, but the reconciliation balance still shows a shortage.

As can be appreciated, irregularities from the reported drop versus information provided in the BOL can occur for several reasons. For example, flaws in the truck design can cause fuel product to remain within the carrier 110. Further, the irregularity can be an indication that the carrier 110 was shorted at the rack 105 during loading. Further still, the irregularity can be an indication of a faulty valve or that that tank or valve was not fully pressurized in order to open, allowing for the full drop of the liquid product. Additionally, the irregularity can be an indication of theft or other fraudulent activity, which can immediately be identified through exemplary embodiments. That is, because the book to physical reconciliation process is performed immediately before and after a drop, the CIM system 120 can notify the retail facility's retail system 130, or vice versa, and the appropriate action can be taken depending upon, the specific irregularity.

Through use of the system 100, and the reconciliation process usable with the system 100, irregularities in tracked data can be identified and investigated within a short period of time. This is in contrast to existing systems where irregularities cannot be identified for potentially many hours following delivery of the liquid product to the retail facility 128.

It will be understood that there are various other reasons for the system identifying variances or irregularities between actual measured data and data stored at the CIM system 120 that represents what the actual measured data should be. Table 1 below illustrates a list of some exemplary reasons, while other reasons for the variances can also occur.

TABLE 1

| Category | Reason |
|---|---|
| Loading | Incorrect Volume Measurement |
| | Incorrect Density Measurement |
| | Incorrect Temperature Measurement |
| | Wrong Product |
| Transporting | Temperature Change |
| | Trailer Evaporation |
| | Trailer Leak |
| | Theft |
| Delivery | Delivery Evaporation |
| | Equipment Leak |
| | Product/Tank Mismatch |
| | Trailer Retain |
| On Sight Storage | Incorrect Tank Calibration |
| | Faulty Probe |
| | Temperature Change |
| | Tank Leak |
| | Tank Evaporation |
| | Theft |
| On Sight Plumbing: | Temperature Change |
| | Plumbing Leak |
| | Submersible Pump Leak |
| On Sight Dispensing | Temperature Change |
| | Dispenser Leak |
| | Dispenser Calibration |
| | Pulser Tampering |
| | Pump Test Override |

During the various reconciliation processes performed within the system 100, such as before and after a delivery, the CIM system 120 can isolate some of the variance categories from other categories, thereby allowing a more accurate determination of the correlation between variance and the true causes for that variance. For example, if a variance occurs during a time period in which no delivery has taken place, but fuel has been pumped, the process can rule out the "Loading", "Transporting" and "Delivery" sections for variance, so the process can more accurately correlate the variance to the "On Site" sections.

Figure 3:
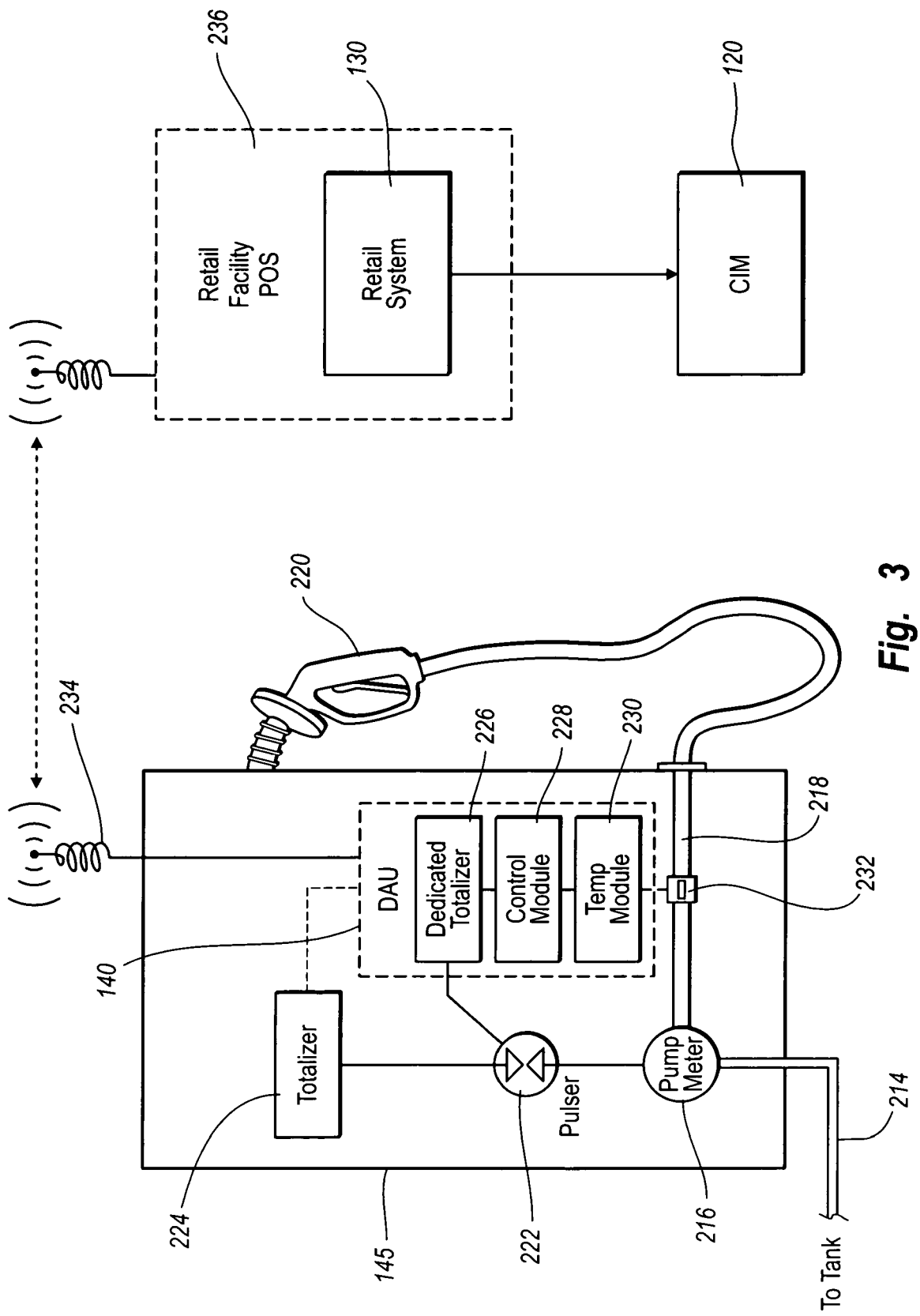
FIG. 3 illustrates a schematic representation of a dispenser at a liquid product retail facility in accordance with example embodiments.

Turning now to FIG. 3, illustrated is one configuration of the dispenser 145 which delivers fuel to consumers of the retail facility 128 (FIG. 1). The dispenser 145 can include an inlet conduit 214 that receives liquid product from the tank 155 (FIG. 1). The inlet conduit 214 fluidly communicates with a meter 216 that is affected as the liquid fuel product passes along the inlet conduit 214 and out through an outlet conduit 218, which is in fluid communication with a dispensing nozzle 220. As is standard with most dispensers 145, a pulser 222 is provided that sends pulse signals to a dispenser volume indicator or totalizer 224 for determining and/or displaying a volume and price of fuel dispensed when the nozzle 220 is active. The pulser 222 cooperates with a shaft (not shown) of the dispenser's meter 216 and changes the mechanical rotational movement of the meter 216 into electrical pulses representative of the number of revolutions of the meter shaft. By counting the number of pulses in the totalizer 224, the quantity of fuel flowing through the nozzle 220 can be tracked. The signals from the pulser 222 can be used by the totalizer 224 to count accumulated pulses, which can be converted, in other dispenser electronics, to volume of fuel flowing through the nozzle 220.

Exemplary embodiments provide for the data acquisition unit 140 (also shown in FIG. 1) to have a dedicated totalizer 226 and a control module 228 that can be connected or linked in parallel to the totalizer 224. Optionally, the data acquisition unit 140, and the control module 228, can receive signals from the totalizer 226. Similar to the standard totalizer 224, the dedicated totalizer 226 receives pulses from the pulser 222 in order to determine the volume of liquid product pumped from the meter 216 through nozzle 220. In addition, the volume can also be adjusted by the temperature readings from a temperature module 230 that determines temperature with a temperature probe 232 disposed within either the inlet conduit 214, the meter 216, the outlet conduit 218 or the conduit extending from the pump meter 216 to the nozzle 220. The control module 228 within the data acquisition unit 140 can assign time-stamps to the gathered temperature and volume readings, and report this information to the retail facility point of sale (POS) 236 or the retail system 130 at the retail facility 128 (FIG. 1), which will eventually be transmitted to the CIM system 120. This information can be transmitted via a wireless connection as shown by antenna 234. However, data can be transferred via a wire directly connected to the retailed facility point of sale 236. Alternatively, the data can be reported via the Internet to the CIM system 120. Of course, other ways of transmitting the data collected by the data acquisition unit 140 are also available. Any specific method for transmitting the data from the retail facility 130 directly to the CIM system 120 can be used. The above example is provided for illustrative purposes only, and is not meant to limit or otherwise narrow the scope of the present invention unless explicitly claimed.

As mentioned above, the control module 228 can time-stamp the temperature data and volume data in a number of different ways. For example, the control module 228 can include an actual time of day that can be updated via satellite or other means in order to keep the control module 228 accurately calibrated. In another embodiment, the control module 228 keeps time from the initiation of the reconciliation process as an offset from the time that has passed since the initiation of the reconciliation process. This offset can then be added to the reconciliation start time at the retail facility 128 (FIG. 1), or the retail system 130, for ensuring that the time-stamp on the measurement data corresponds to the time-stamp at the retail system 130. This has the advantage of not having a continual need for updating the time on the control module 228. In addition, because the reconciliation process manipulates time-stamped volume readings from various times, if the clock within the control module 228 is only slightly inaccurate, the methods and processes described herein adequately compensate for such inaccuracies. Nevertheless, any particular type of time-stamping can be used, and those described herein are for illustrative purposes only and are not meant to limit or otherwise narrow the scope of the present invention unless explicitly claimed.

As previously mentioned, the additional or dedicated totalizer 226 can be utilized for several different purposes. For example, readings from the additional totalizer 226 can be compared to volumes reported from the weights and measures certified dispenser firmware for determining an appropriate pulse to gallon conversion ratio. This conversion ratio can then be used during subsequent reconciliation processes for detecting such things as clearance in the meter 216 caused by normal wear and tear. Further, this conversion can also be monitored such that, if it deviates from some predetermined threshold, an exception can be raised and appropriate action taken. This second or dedicated totalizer 226 can also be used to determine other problems in the system 100 (FIG. 1), such as theft, a bad totalizer 224, a bad pulser 222 and/or even a problem with the dedicated totalizer 226. The values read from the totalizer 226 during the reconciliation process even allow the CIM system 120 to determine historical flow rates achievable through each dispenser 145.

As would be recognized, the pulse to gallon conversion ratio can be calculated by taking the volume at the pump head, which the local governmental weights and measures department certifies as being accurate, referencing the totalized pulses that were measured through the dedicated totalizer 226, and dividing the totalized pulses from the dedicated totalizer 226 by the weights and measures certified gallon, to come up with the new pulse to gallon conversion ratio. This pulse to gallon conversion ratio can then be monitored such that, if it changes by more then a certain percentage (e.g., 5%), an exception report can be generated indicating such things as a problem with the pulser 222 not being consistent. In addition, this process of determining a pulse to gallon ratio in essence calibrates or allows calibration of each dedicated totalizer 226 upon completion of a sales transaction. In other words, this provides for an automated method to validate the totalizer 224, as a self checking way to ensure that the volumes reported are accurate. In addition, this embodiment can provide an automated way to calibrate the dedicated totalizer 226.

It should be noted that, while FIG. 3 shows the data acquisition unit 140 as being part of the dispenser 145, this is for the purpose of illustration only. In other embodiments, the data acquisition unit 140 can be physically located within the retail facility 128 (FIG. 1). Alternately, the data acquisition units 140 for several different dispensers 145 can be located in the vicinity of the dispensers 145 or the retail facility 128.

Turning again to FIG. 1, now that we have discussed the general features of the system 100, we will begin to discuss some additional methods, systems, and computer program products for using the system 100 to control, monitor, track, and reconcile the storage and delivery of fuel at various locations within the system 100. By so doing, the methods, processes, and other systems can be used to reconcile measured physical volumes of fuel within one or more tanks against book inventory or balances maintained at the CIM system 120 and/or the retail system 130.

As implied above, the system 100 can be used to perform on-demand or periodic reconciliation of a physically measured volume of a fuel product against the book balance or inventory. For example, the reconciliation process can be performed continually throughout the day at five minute increments or other incremental time period. This would allow for the immediate notification of deviations such as theft in order to identify the culprit and take the appropriate action. Alternatively, or in addition to the continual reconciliation processes, on demand reconciliation of the physically measured volume of a liquid product against the book balance or inventory can occur at any given time throughout the day, even when high volumes of product are being dispensed to customers. This provides for an accurate measure of all delivered and dispensed product, regardless of temperature variations throughout the system.

The reconciliation process generally entails tracking fuel flowing into and out of the various storage tanks within the system 100. Individual or groups of tanks can be monitored, and the volume and temperature of fuel within individual or groups of tanks can be reconciled against the stored book balance or inventory stored at the CIM system 120. To perform the reconciliation, data from the various tank gauges and the dispensers (e.g., fuel temperature, volumes, pending and completed transactions, etc.) can be rapidly gathered. The data can be individually time-stamped and then manipulated to a common time-stamp before being compared against data representative of the book balance or inventory recorded at the CIM system 120. Any disparity between the data sets is considered as a variance. For accuracy, the physically measured data can be recorded in a rapid manner (e.g., in time intervals of less than 2 seconds). With a large data set, the accuracy of the reconciliation process is increased.

The book to physical reconciliation process is described as a virtual real-time process due to the fact that the rapid read of measurements do not simultaneously occur because of latencies within the system and other complications. Nevertheless, these readings, or data, for meters, temperatures of the liquid product, liquid product height in the tank, and other physical measurements, can be brought back to a single point in time for the book to physical reconciliation process.

Following hereinafter is a more detailed description of the reconciliation process and associated methods, systems and computer program products. The CIM system 120 can initiate the reconciliation process by initiating a reconciliation request to the retail system 130 at the appropriate retail facility 128. This request can entail delivering data to the retail system 130, the data including a number of data fields. The data fields associated with the request can include, but are not limited to, (i) retail facility ID, (ii) date and time of request, (iii) the reconciliation time period, i.e., the time period over which the data is to be accumulated, and (iv) tank and/or manifold ID's, it being understood that single or multiple tanks can be associated with a tank manifold ID.

As can be recognized, the reconciliation time period can be either hard coded or it can be an adjustable time period. Further, the time period may be a default value if no value is set by the user. In any event, the longer the time period used to accumulate the data, the higher the confidence level and accuracy of the reconciliation or the physical measurements for the reconciliation process. Because this time duration can be dynamically adjusted and/or predetermined or hard coded within the system, any particular reference to how the duration for accumulating data is determined is used for illustrative purposes only and is not meant to limit or otherwise narrow the scope of the present invention.

Upon receiving the request, the retail system 130 (i) checks the status of the outstanding transactions at the one or more dispensers 145, (ii) generates a base time-stamp for the request, and (iii) initiates each measuring device to accumulate data. The devices used to measure the data can include, but are not limited to, devices that provide liquid product flow through the dispensers, liquid volume level measurements, liquid product specific gravity or density, liquid product temperature at the tank, at the dispenser, etc., and dispenser sales measurements through meter readings and temperature readings 150. Data acquisition units 140 are utilized to rapidly collect or accumulate measurements and assign a time-stamp to each measurement as appropriate. This rapid read of measurement data from the measurement devices can be made more efficient by limiting the CPU processing power used by other devices in order to accumulate the maximum amount of data within the specified time period. For example, the reading of leak detecting sensors or optical sensors that detect if there is condensation or liquid somewhere there shouldn't be, can be shut down during the rapid read process, in order to more fully utilize the CPU power of these probe interfaces. This allows the CPU to focus on rapidly reading physical measurement data, such as tank gauge height, dispenser readings or data, and temperature readings or data throughout the tank manifold system. In some embodiments, certain tank gauge probes can be singled out for reconciliation activity, allowing the tank gauge console 135 to further narrow the data collection interval.

As these data acquisition units 140 collect the measurement data from the various devices, the retail system 130 receives the measurement data. Either the data acquisition units 140 or the retail system 130 can assign precise time-stamps to each one. These time-stamps can then be sent along with sales status data to the CIM system 120. Generally, the data sent to the CIM system 120 can include, but is not limited to, general facility data, tank specific data and dispenser specific data. For instance, the general facility data can include, but is not limited to, the (i) retail facility ID, (ii) date and time that the data is sent, and (iii) ambient temperature. The tank specific data, can include, but is not limited to, (i) volume measurement, (ii) height measurement, (iii) temperature measurement, (iv) beginning date and time of the data accumulation, (v) tank/manifold ID, (vi) code identifying the fuel within the tank or set of manifolded tanks, (vii) tank number, (viii) water level, and (ix) density. The dispenser specific data can include, but is not limited to, (i) dispenser ID, (ii) average temperature of sale, (iii) fuel volume, (iv) closed sale or transaction information, including transaction time, invoice number, volume, temperature, and tank(s) from which the fuel was dispensed. One or more of the above data can have an associated time-stamp that is set by the data acquisition unit 140, the measuring device itself, and/or the retail system 130.

One example of a sample data series according to this embodiment is shown in Table 2, below, where "N"—indicates the tank is not too turbulent to postpone concise volume determination; "O" references an open transaction; "C" references a complete transaction; "W" references water; "S" references a mathematically smoothed height determined by the tank gauge console 135, from a number of recent raw height readings; "F" references real-time raw height readings reported by tank gauge console 135; and "Temp" references temperature of fuel dispensed.

It should be noted that, while Table 2 shows some examples of the types of data that can be collected, such as a tank temperature reading, pump or dispenser dispensed volume, and tank volume, these readings are provided by way of example only. Many other types of data can be collected, over both very long (e.g. days) and very short (e.g. many readings per second) periods of time. Additionally, readings for a plurality of pumps or dispensers, tanks, delivery vehicles, etc. can be included when performing the reconciliation process.

TABLE 2

| TABLE | TANK | TANK TEMPERATURE | TURBULANCE |
|---|---|---|---|
| TANK READING | 4 | 67.74 | N |

| TABLE | PUMP | READ_TIME | TEMP | QUAN | TRAN_TYPE |
|---|---|---|---|---|---|
| INTERIM_SALE | 14 | 28-DEC-2004 11:37:41:013000 | 67 | .55 | O |
| INTERIM_SALE | 14 | 28-DEC-2004 11:37:42:036000 | 67 | .55 | O |
| INTERIM_SALE | 8 | 28-DEC-2004 11:37:41:064000 | 68 | 12.38 | O |
| INTERIM_SALE | 8 | 28-DEC-2004 11:37:42:066000 | 69 | 12.38 | O |
| INTERIM_SALE | 9 | 28-DEC-2004 11:37:39:999000 | 63 | 5.593 | C |

| TABLE | TANK | READ_TIME | LEVEL_TYPE | HEIGHT |
|---|---|---|---|---|
| TANK_LEVEL | 4 | 28-DEC-2004 11:37:40:000000 | W | .22 |
| TANK_LEVEL | 4 | 28-DEC-2004 11:37:40:001000 | S | 76.53 |
| TANK_LEVEL | 4 | 28-DEC-2004 11:37:40:114000 | F | 76.52 |
| TANK_LEVEL | 4 | 28-DEC-2004 11:37:40:120000 | F | 76.52 |
| TANK_LEVEL | 4 | 28-DEC-2004 11:37:40:126000 | F | 76.52 |

When the time-stamped data is forwarded to the CIM system 120, the CIM system 120 can then update the perpetual inventory book balance based off the virtual real-time sales reports and the dispenser(s) status. Further, the CIM system 120 can derive statistically smoothed physical readings at a single point in time and then reconcile book inventory with physical inventory, generate various exception reports, and post those reports to the appropriate users.

As mentioned above, the retail system 130 can initiate rapid data accumulation from numerous measuring devices. This rapid accumulation of data at various points in time has many advantages over existing systems and techniques. For example, the rapid accumulation of data can be used for the physical volume determination within the inventory tank at a point in time using the plurality of data measured during the time interval. In other words, in order to determine the amount of liquid product within a tank, the difference in volume meter readings is taken at rapid intervals. Due to an inherent attenuation wave motion of the surface of the liquid in the tank 155 after a drop of the product into the tank 155, it can be difficult to accurately determine the physical volume of the liquid within the tank. Additionally, the pickup tube 160 can vibrate when product flows through the dispenser 145, causing additional turbulence and again making it difficult to accurately determine the physical volume of the liquid within the tank 155.

Figure 4:
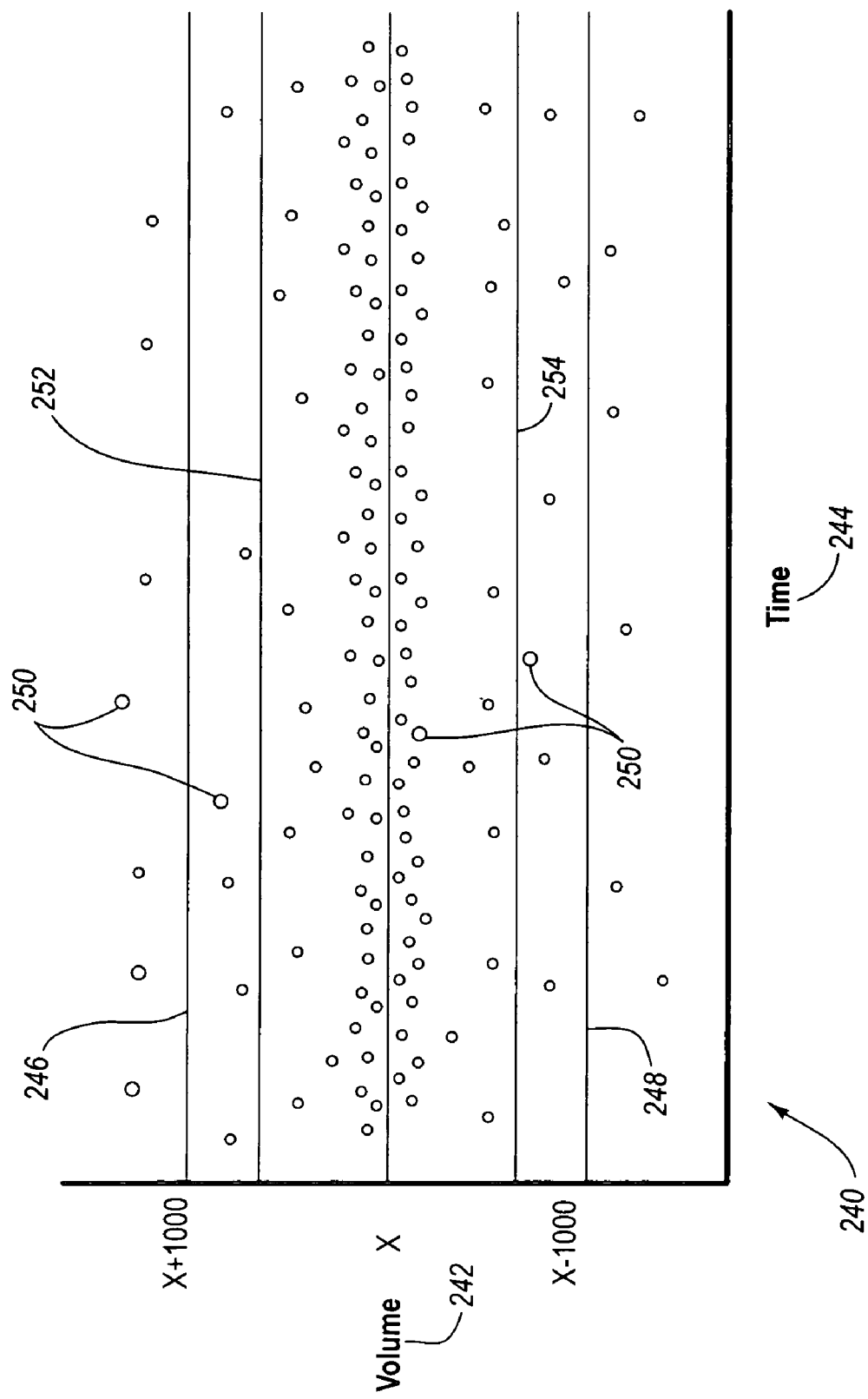
FIG. 4 illustrates a graph showing multiple volume measurements within a tank over a period of time.
Figure 5:
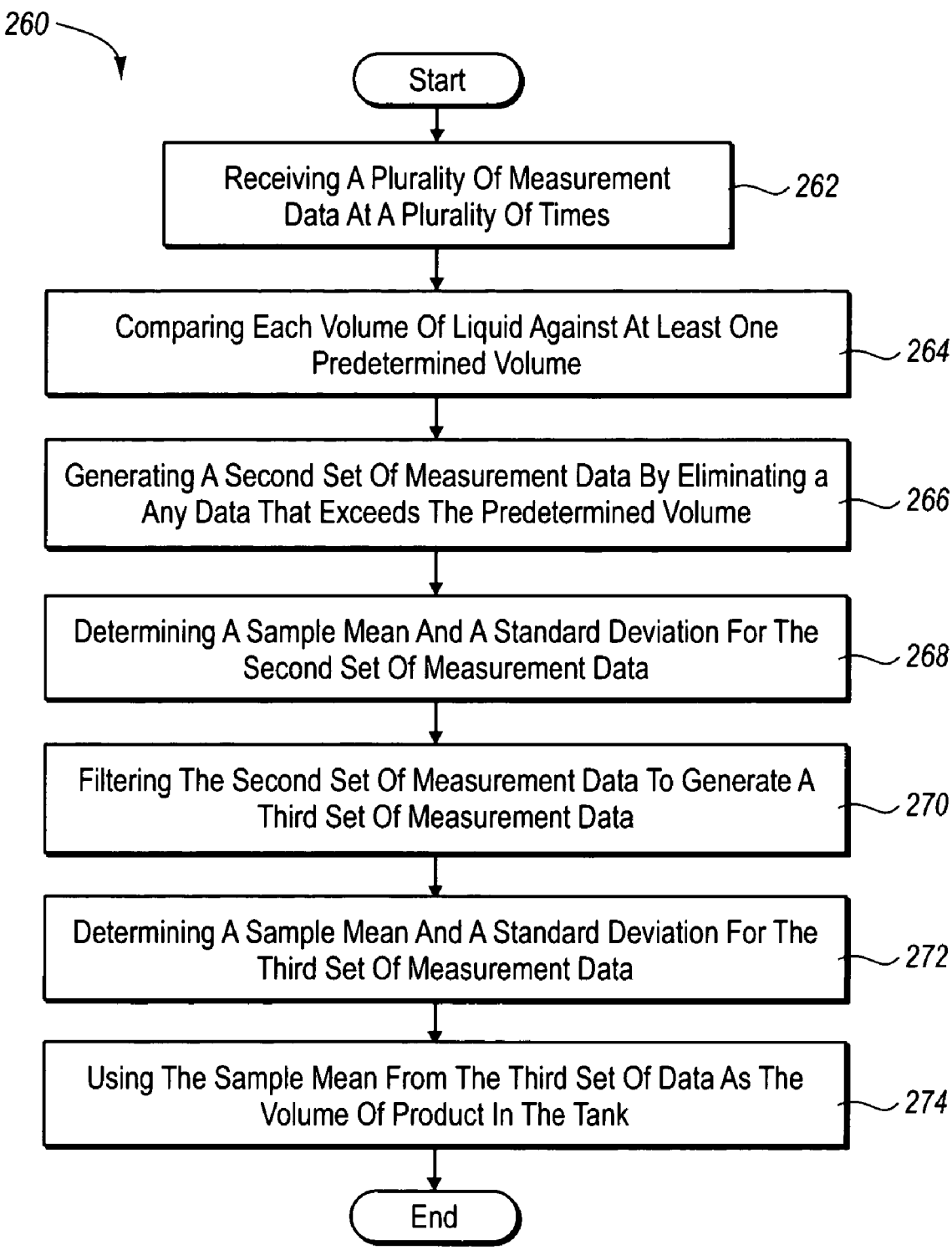
FIG. 5 illustrates a flowchart of one method of minimizing the effect of waves or ripples in the tank, according to one embodiment of the present invention.

The adverse affects of this wave motion on a typical reconciliation process can be overcome through the reconciliation process of the present invention. Turning to FIG. 4, illustrated is a graph 240 that can be used to discuss one manner of canceling or compensating for the wave effects in the tank 155 (FIG. 1). The graph 240 shows the measurements of tank volume 242 as a function of time 244. Various measurements for the volume are plotted on graph 240 as a plurality of data points 250. FIG. 5 is a flowchart 260 that discusses specific steps for the manner or method of canceling or compensating for the wave effects.

As mentioned before, the data points 250 are accumulated very rapidly over time to produce a data sample. For example, 30-40 data points 250 can be measured for the fuel height in the tank 155 (FIG. 1) every second. In still other embodiments, as many as 100 data readings can be taken every second. These data measurements can be forwarded to the CIM 120, as represented in block 262 of flowchart 260 in FIG. 5. Each of these volume measurements can then be compared to at least one predetermined volume, as represented in block 264. In essence, this method first filters out the rapidly accumulated data representative of liquid volumes and heights to eliminate various blips or spikes that are not representative of the possible. Thus, for example, unreliable data such as data indicating a predetermined volume that is more or less than a maximum tank volume or one or more other volumes of liquid identified as unreliable is filtered out.

For example, based upon the duration of the sample request, a deviation threshold below and above the "S" type of reading (as discussed above with respect to Table 2) and the deviation allowable above and below, can be determined by multiplying the standard threshold level by the number of seconds in the request. If one uses, for example, 100 gallons as the standard threshold level, and the reconciliation period is ten (10) seconds, then the threshold level would be 100 gallons times 10 seconds, or plus or minus 1000 gallons from that standard high reading. This 1000 gallon level is represented by lines 246 and 248 in FIG. 4. Data readings 250 that fall above or below that 1000 gallon threshold are ignored as unreliable in the subsequent steps. Data that is identified as unreliable may be, for example, (A) a volume of liquid that is more than a maximum tank volume; (B) a volume of liquid that is less than a minimum tank volume; or (C) one or more other volumes of liquid that are identified as being unreliable. These threshold levels are used to identify what readings are obviously erroneous, which generates a secondary data set as represented by block 266 in FIG. 5.

With the secondary data set, the CIM system 120 (FIG. 1) can calculate a sample mean and a sample standard deviation for that filtered secondary data set, as represented by block 268. Once determined, the secondary data set can be filtered using the sample mean and sample standard deviation. For instance using this secondary data set, the CIM system 120 (FIG. 1) can discard measurement data for the tank volume outside of so many standard deviations, thereby filtering the collected data set twice. For instance, the user can select X number of standard deviations and the CIM system 120 (FIG. 1) discards any acquired data that is outside the X number of standard deviations. Thus, for example, any measurement data that has a value that is more or less than a predetermined number of standard deviations from the mean is eliminated. Therefore, any of the volume readings that are within plus or minus X standard deviations are determined to be statistically acceptable, as represented by block 270 in FIG. 5.

The remaining values can be included in a third data set sample for which a third data set sample mean and standard deviation can be calculated, as represented by block 272. This narrower data sample is shown as all data points 250 between lines 252 and 254 in FIG. 4. The remaining data sets can then be used to determine the actual volume within the tank 155 (FIG. 1) at a specific point in time, as represented by block 274.

Using statistical techniques known to those of skilled in the art, the sample mean and standard deviation can be used to determine a percent level of confidence that a measure of volume is accurate within the allowable threshold of accuracy. Alternately, the percent confidence threshold and the sample standard deviation for the volume measurements can be used to determine a volume threshold of accuracy. Temperature measurements can also be similarly filtered.

Using the product flow amounts, determined through the rapid accumulation of dispenser data, and the tank manifold volume readings or data that have been filtered in accordance with the method of FIG. 5, the CIM system 120 (FIG. 1) can adjust each tank manifold volume reading or data backwards, one by one, to a single time of reconciliation, and then analyze the same during the reconciliation process. Using this method of time-aligning the filtered data thus accumulated, the ripple/wave effect within the tank can be compensated by averaging the collective tank manifold volume readings or data aligned to that point in time. This method allows for compensation of the ripple/wave effect irregardless of ongoing sales transactions being dispensed. This method further allows for the consideration of fuel flow from one or more dispensers 145 (FIG. 1).

Referring again to FIG. 1, in addition to bringing a plurality of tank volumes to a single point in time, and as mentioned above, the methods, systems, and computer program products usable in system 100 can rapidly accumulate data for meter readings and temperatures at the dispenser 145 and bring meter readings and temperature readings 150 corresponding to the dispenser 145 back to a single point in time. A confidence level for both tank measurements and the dispenser readings can be generated based on the above described standard deviation, which is a function of the duration of the reconciliation process and the number of data points accumulated during this time period. Therefore, the longer the system collects data and performs the reconciliation process, the greater the reliability of the data and results.

As previously mentioned, during the reconciliation process the status of sales transactions are accounted for in a virtual real-time basis. By monitoring the various states of dispenser transactions, the CIM system 120 can separate those transactions that should be included in an adjusted physical inventory or volume versus adjusted book inventory or volume. The variance resulting from the analysis being the adjusted physical volume minus the adjusted book value. The adjusted physical volume for the tank 155 used for reconciliation can include both net interim sales plus the net physical tank volume. The net sales closed are then subtracted from, and the net deliveries added to, the net beginning value or the beginning book value in order to determine an adjusted book value.

The net interim sales can be divided into several categories. These include interim open sale, interim complete sale and interim stack sale. An interim open sale refers to a transaction that is occurring (i.e., sales transaction) at the time of reconciliation. In other words, the nozzle 220 (FIG. 3) is "off" of the pump dispenser 145 and is either accumulating volume, i.e., fuel is flowing from the nozzle 220, or has the capability of increasing the volume flow. An interim complete sale occurs upon the hanging up of the nozzle 220 (FIG. 3), i.e., return of the nozzle 220 (FIG. 3) to a housing of the dispenser 145, but before the transaction has been fully closed, i.e., payment has been made and accepted. Interim stack sale, which is an extension of the interim complete sale, indicates that either another interim open sale or interim complete sale, or multiples thereof for interim complete sales, resides on the same dispenser 145. For example, after one interim complete transaction or sale, another customer can start using the pump or dispenser prior to the closure of the sale or transaction, i.e., payment has been made and accepted, that was previously considered an interim complete transaction or sale. Values of all of these interim open, complete and stacked sales or transactions then make up the net interim sales that are used for the adjusted physical volume in determining the variance, i.e., the difference between adjusted physical volume and the adjusted book volume.

Closed transactions can also include two states. These include closed transactions that are waiting to be sent to the CIM system 120, and those closed transactions that have been sent to the CIM system 120 from the retail system 130. These closed transactions can be included in the adjusted book volume, but there also can be a mechanism whereby duplications are excluded. Accordingly, exemplary embodiments provide for determining and deleting duplicate copies of closed transactions, i.e., transactions that were waiting to be sent at the beginning of the reconciliation process, which have since been updated on the book balance at the CIM system 120. As would be recognized, this advantageous feature can be accomplished in many ways. For example, a comparison of closed transactions posted before or at the initiation of the reconciliation process and at the close of the initiation process can be compared, and duplicates extracted. Alternatively, an exception can be raised such that no closed transactions can be recorded to the CIM system 120 during the reconciliation time period. Other well known ways of determining duplicate reporting for closed transactions are also available. Accordingly, the specific process or system for determining duplicate closed sales transactions outlined above is provided for illustrative purposes only, and is not meant to limit or otherwise narrow the scope of the present invention unless explicitly claimed.

Generally, each transaction described above can have certain data associated with it that is useable for the reconciliation process. For instance, each transaction can have a data set associated with the transaction. This data set can include, but is not limited to, tank information identifying which tank(s) the fuel was dispensed from. As discussed before, fuel can be dispensed from a single tank or, in the case of intermediate grade fuel, from multiple tanks. The tank information can designate the tank(s) and the blend ratio where appropriate.

In addition to the above, the transaction data set can include the sale or transaction time, either commencing or completing the volume of fuel dispensed, the fuel's temperature, and an associated invoice or identifying number. It will be understood that various other information can be associated with each transaction, and the above are only examples of some useful information.

As mentioned above with respect to FIG. 3, the dispenser 145 can communicate with the retail system 130 in virtual real-time using various wireless communication technologies, such as RF, WiFi, etc. When the dispenser 145 is flagged as an interim sale or transaction, e.g., an interim open transaction, interim complete transaction or interim stack transaction, the measuring devices associated with the dispenser 145 can communicate at least temperature and volume readings directly from the dispenser 145 for reconciliation purposes in a virtual real-time basis. By so doing, the CIM system 120 can receive temperature and volume readings (e.g., via wire or wireless signaling), on a real-time or virtual real-time basis regardless of the status of dispenser 145. With the control modules 228 (FIG. 3) within each dispenser 145 assigning time-stamps to the temperature, volume and dispenser or pump status reads, and the clock within the control module 228 (FIG. 3) indicating the offset from the time that has passed since the initiation of the reconciliation process, the reconciliation process can be performed regardless of the status of dispenser 145 as the offset time can be added to the reconciliation start time at the retail system 130.

To help better describe the reconciliation process and the process of bringing each measured value back to a single time to allow for accurate variance calculations between the book balance or inventor and the measured volume, the following example and description of the reconciliation process is provided.

Initially, once the CIM system 120 receives the measurement data and the time-stamps, the CIM system 120 can begin the reconciliation process. As an initial step, the process can include converting the measured fuel level readings to net tank gallons. Converting the measured fuel level readings utilizes a tank volume formula that provides a relationship between the height of fuel within a tank and the volume of fuel in the tank. Using the tank identifier, the CIM system 120 can identify the specific tank volume formula table and associated conversion processes to convert the measured height to a volume. Since a single formula cannot generally be identified as showing the true relationship of height to volume in the tank, piecewise formulas generally can. The piecewise formulas can be appropriately referenced with either a height or volume index. Additional description of the method for obtaining the chart and the associated conversion processes will be discussed hereinafter. For purposes of this example, provided below in Table 3 is a portion of the exemplary height to volume conversion data useable to determine the volume of fuel in the tank. The value of X is the actual measured height identified by the height measurement device, with at least a portion of the device disposed in the tank.

TABLE 3

| Height (Inches) | Volume Formula |
|---|---|
| 0 | 2.6613 × 2 + 50.029X |
| 5 | 3.5 × 2 + 48.5 X − 6 |
| 9 | 2.75 × 2 + 59.95 X − 50.35 |
| 13 | 2 × 2 + 78.6 X − 167.7 |
| 17 | 2 × 2 + 79 X − 174 |
| 21 | 1.5 × 2 + 99 X − 377.5 |
| ... | ... |

Once the fuel level and conversion process are identified, the fuel level readings can be converted to gross volumes having the same time-stamp as the obtained fuel level reading. Using this information, the relative position of the temperature sensors or probes should be considered, by accessing the appropriate thermistor position information stored at the CIM system 120.

As mentioned before, each tank 155 can include one or more temperature measurement devices or sensors, such as thermistors with associated probes. The thermistors can measure the temperature at multiple different levels in the tank 155. One method for accurately installing the probe can include (i) identifying the span of the thermistors' probe, (ii) adding an offset per manufacturer information, (iii) dividing adjusted span by number of thermistors plus one to determine the thermistor increment or spacing between thermistors, and (iv) assigning heights to the thermistors as per the manufacturer numbering sequence. For instance, the thermistors can be numbered and the probe positioned according to the following Table 4.

TABLE 4

| Thermistor Number | Height of Probe |
|---|---|
| 1 | 20 inches |
| 2 | 40 inches |
| 3 | 60 inches |
| 4 | 80 inches |
| 5 | 100 inches |
| ... | ... |

With the thermistor information identified, those thermistors that are at or below the lowest measured fuel level reading can be used to determine liquid temperatures. Once the specific applicable thermistors are identified, the CIM system 120 can determine the representative temperature for the liquid by averaging the temperature from the thermistors actually located in the fuel. Using this temperature and the API gravity (or other density measurement) for the product in the tank 155, the CIM system 120 can generate an appropriate gross to net conversion factor, as per the American Society for Testing and Materials (ASTM) formula known to those skilled in the art.

With this conversion factor, the CIM system 120 can then convert the gross inventory volume per fuel level to a net inventory volume that can be used for the reconciliation process. It will be understood that a similar number of steps can be taken to convert the interim gross sales volumes, i.e., the fuel flowing out of the selected tank, to a net volume, thus eliminating the possibility of variance caused by change in temperature when the fuel is dispensed.

With the net inventory volume and net fuel recorded sales identified, each having an associated time-stamp, the CIM system 120 can convert the individual time-stamped tank volumes to cumulative time-stamped volumes. This process can include sorting all time-stamped tank readings from the tank or manifold by their respective time-stamps. For instance, for a three tank manifold the results could be:

Tank 3 reading@17:28:39:165—11658.32 gal
Tank 1 reading@17:28:39:377—11658.12 gal
Tank 2 reading@17:28:39:581—11736.27 gal
Tank 3 Reading@17:28:40:398—11658.36 gal
Tank 1 Reading@17:28:40:611—11602.34 gal
Tank 2 Reading@17:28:40:815—11733.20 gal With this ordered list, the CIM system 120 can order "series" of tank readings by taking the first time-stamped fuel height reading (regardless of which tank is read first) and associating it with the closest time-stamped reading of each additional tank in the manifold. Each tank reading can only reside in one series. For instance, for a three tank manifold the results could be:

$1^{st}$ Series $\begin{cases} \text{Tank 3 reading@17:28:39:165} - 11658.32 \text{ gal} \\ \text{Tank 1 reading@17:28:39:377} - 11658.12 \text{ gal} \\ \text{Tank 2 reading@17:28:39:581} - 11736.27 \text{ gal} \end{cases}$ $2^{nd}$ Series $\begin{cases} \text{Tank 3 reading@17:28:40:398} - 11658.36 \text{ gal} \\ \text{Tank 1 reading@17:28:40:611} - 11602.34 \text{ gal} \\ \text{Tank 2 reading@17:28:40:815} - 11733.20 \text{ gal} \end{cases}$ -continued $$N^{th} \text{ Series} \begin{cases} * \\ * \\ * \end{cases}$$

Using only those tank readings that comprise a complete series, the CIM system 120 can calculate the time difference between the first time in the series and every time in the series. For instance, the first tank series could provide the following results:

| Tank Reading | Difference |
|---|---|
| Tank 3 reading @ 17:28:39:165 | 0 |
| Tank 1 reading @ 17:28:39:377 | 212 |
| Tank 2 reading @ 17:28:39:581 | 416 |

With the differences calculated, the CIM system 120 can average the differences in time and then add the average difference back to the first time from the series to determine a cumulative series time-stamp. For instance, the average for the above-identified first series can be 209.33, so the cumulative series time-stamp can be 17:28:39:165+209.33=17:28:39:374.

With this cumulative series time-stamp identified, the CIM system 120 can then sum the volumes from each reading in the series and assign the summed volume to the cumulative series time-stamp. The first time-stamped series may become the "Time of Reconciliation." So, in the example herein, the summed volume would be $$\begin{array}{r} \text{Tank 3 reading} - 11658.32 \text{ gal} + \\ \text{Tank 1 reading} - 11658.12 \text{ gal} + \\ \underline{\text{Tank 2 reading} - 11736.27 \text{ gal} =} \\ 35,052.71 \text{ gal} \end{array}$$

And, as mentioned above, the cumulative time-stamp associated with this volume would be 17:28:39:374. Note that other cumulative time-stamps from other series may be used for the Time of Reconciliation, which as described in greater detail below is the time that all measurement readings (e.g., temperature readings, dispenser volume readings, tank height readings, etc.) will be brought back to. Accordingly, the use of the first cumulative series time-stamp as the "Time of Reconciliation" is used for illustrative purposes only and is not meant to limit or otherwise narrow the scope of the present invention unless explicitly claimed.

In any event, once the Time of Reconciliation has been determined, a similar process can be performed for each additional series of data in preparation for aligning all tank manifold volume readings to the Time of Reconciliation. In particular, the above described process for determining a cumulative time-stamp and cumulative volume can be performed for each of the series. Accordingly, this aligning process can include identifying the time and volume of the "Time of Reconciliation" and each subsequent cumulative time-stamped tank manifold volume reading.

Once the Time of Reconciliation and subsequent cumulative times for each series are determined, the CIM system 120 can identify sales that appear to have been active beyond the bounds of the tank manifold readings (i.e., active beyond the end time period for the rapid accumulation of measurement data) and extrapolate a new dispenser or pump sales reading. The use of such extrapolated readings further facilitates the backward time alignment of successive tank manifold volume readings, back to the Time of Reconciliation. One method of performing this extrapolation is depicted in FIGS. 6 and 7.

Figure 6:
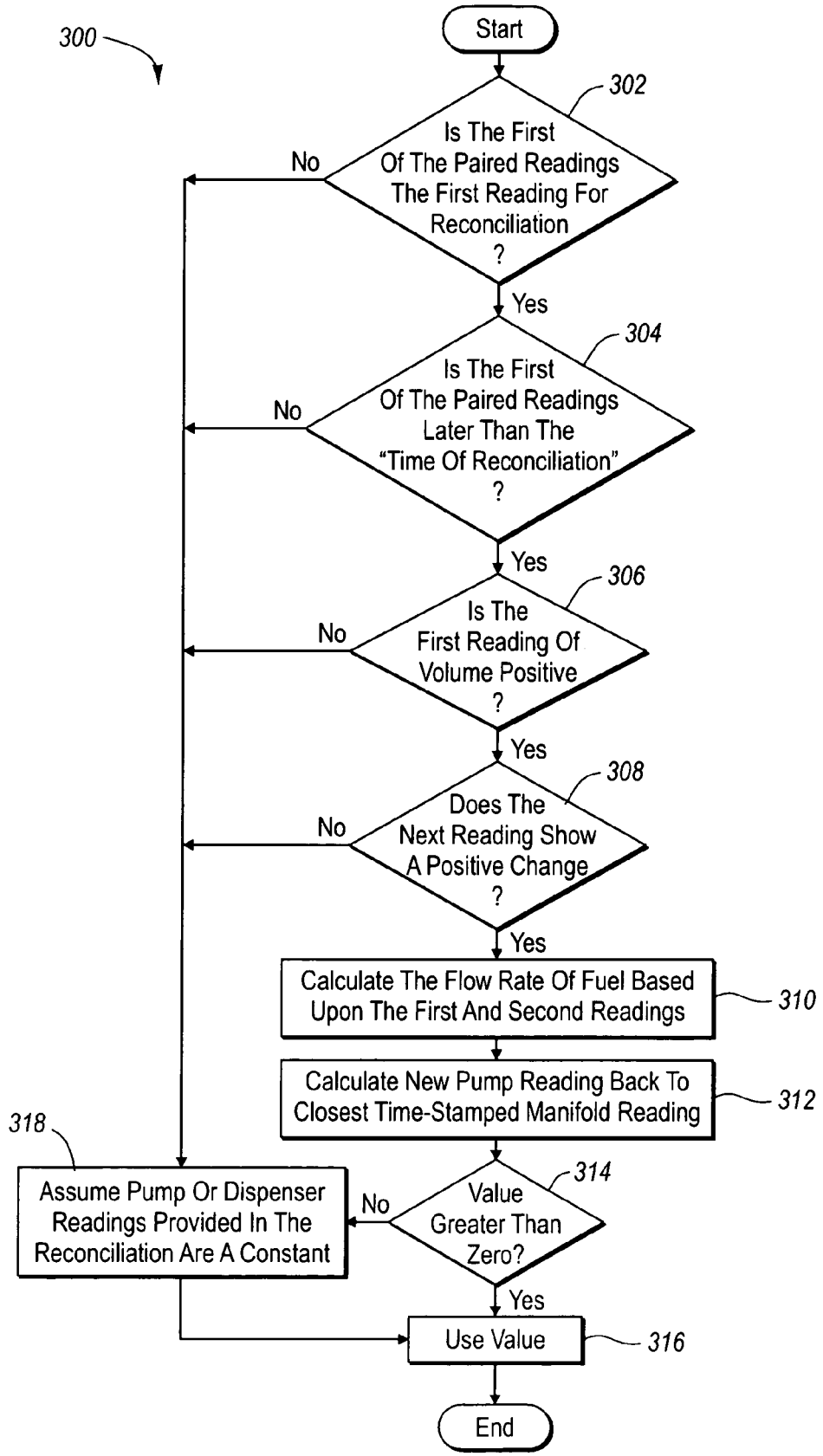
FIG. 6 illustrates a flowchart of a method for identifying sales that are active beyond the bounds of tank manifold readings using a late pump read rule in accordance with example embodiments.
Figure 7:
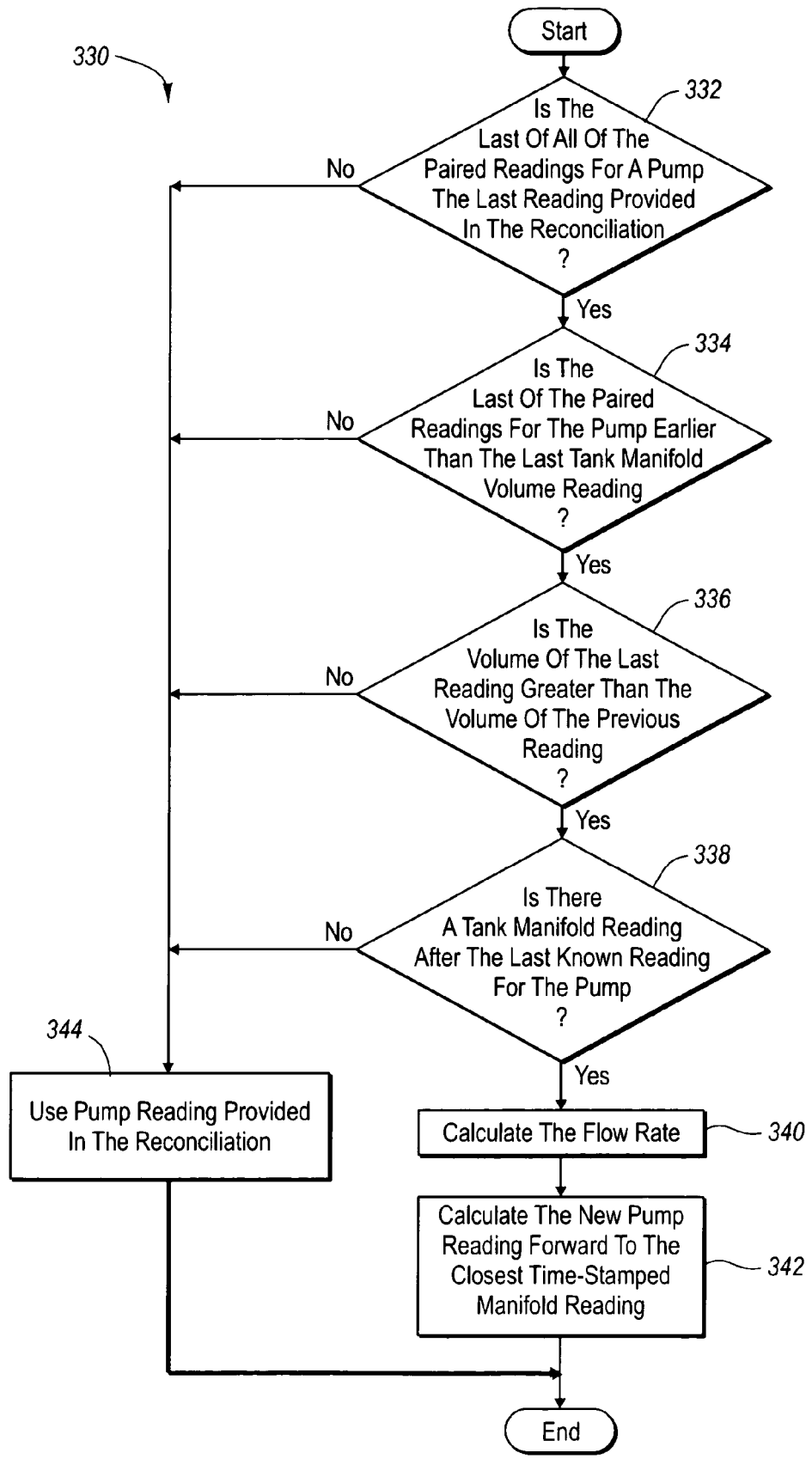
FIG. 7 illustrates a flowchart of another method for identifying sales that are active beyond the bounds of tank manifold readings using an early pump read rule in accordance with example embodiments.

Turning now to FIG. 6, illustrated is a portion of the method to identify sales that appear to have been active beyond the bounds of tank manifold readings and to extrapolate new dispenser or pump sales readings. The method illustrated in FIG. 6 is directed to backward-extrapolating a pseudo dispenser reading from the first of a pair of readings (for each dispenser) identified in the reconciliation process, while the method illustrated in FIG. 7 describes the manner in which to forward-extrapolate a pseudo dispenser reading from a last pair of readings for a particular dispenser or pump during the reconciliation process, to encapsulate the last tank reading.

With continued reference to FIG. 6, the process can include initially identifying whether or not the first of the paired readings is the first reading provided in the reconciliation of a particular pump or dispenser, as represented by decision block 302. If the first pair reading is the first reading for the particular pump, it is next determined whether or not the first of the paired readings is later than the Time of Reconciliation, as represented by decision block 304. If this is the case, it is next determined whether or not to use a "Late Pump Reading" rule, process, or method as described in decision blocks 306 and 308, and blocks 310 and 312.

More specifically, if the identified paired readings meet the criteria of decision bock 302 and decision block 304, the CIM system 120 (FIG. 1) determines whether or not the first reading of the pump or dispenser volume is positive, as represented by decision block 306. When this is the case, it is next determined whether or not the next or subsequent reading shows a positive change in the volume at the pump or dispenser, as represented by decision block 308. If there is a positive change in volume, the CIM system 120 (FIG. 1) calculates the flow rate of fuel based upon the first and second readings, as represented by block 310, and then calculates through extrapolation a new pump or dispenser reading that is tied back to the closest time-stamp tank manifold reading, as represented by block 312. If the particular new pump or dispenser reading is greater than zero, it can be used during the reconciliation process; otherwise the newly identified pump or dispenser reading will be discarded. When the new pump or dispenser reading is less than zero, and when any of the decision blocks 302, 304, 306 and 308 are not in the affirmative, the CIM system 120 (FIG. 1) will use the pump or dispenser readings provided in the reconciliation as being constant in their display of the actual pump or dispenser volume, as represented by bock 318.

Turning now to FIG. 7, a similar process is provided for the last paired reading from a pump or dispenser during a reconciliation process. The process performed by the CIM system 120 (FIG. 1), identified by reference numeral 330, can include determining whether the last of all of the paired readings for a pump or dispenser is the last reading provided in the reconciliation for that pump or dispenser, as represented by decision block 332. When the result of decision block 332 is in the Affirmative, it is next determined whether or not the last of the paired readings for the pump or dispenser is earlier than the last tank manifold volume reading identified during the reconciliation process, as represented by decision block 334. When a last paired reading for the pump or dispenser is earlier than the last tank manifold volume reading, i.e. decision block 334 is in the affirmative, the process can further use an "Early Pump Read" rule, process, or method for determining an early pump or dispenser reading as provided for in decision blocks 336 and 338, and also blocks 340 and 342.

More specifically, it can be determined whether or not the last reading of the pump or dispenser has a volume amount that is greater than the amount for that pump or dispenser in the prior reading, as represented by decision block 336. When this is the affirmative, it is next determined whether there is a tank manifold reading after the last known reading for the pump or dispenser associated with the reconciliation process, as represented by decision block 338. When this criterion has been met, the CIM system 120 (FIG. 1) can then calculate the flow rate between the last pump or dispenser reading and the last tank manifold reading, as represented by block 340 and then calculate a new pump or dispenser reading forward to the closest time-stamp tank manifold reading, as represented by block 342. This new pump or dispenser reading can then be used during the reconciliation process. When any of decision blocks 332, 334, 336, and 338 are in the negative, the pump or dispenser readings provided in the reconciliation process are constant in their display of pump or dispenser volume.

These processes described in FIGS. 6 and 7 yield the following results that can be shown on a timeline:

$$[TV_1] - P_1V_1=1 - [TV_2] - P_1V_2=2 - [TV_3] \qquad (1)$$

Where $TV_n$ is the nth tank manifold volume reading, $P_n$ is the nth pump reading, and $V_n$ is the volume of the nth pump reading. When using the "Late Read Rule" one would create $P_1V_0$, with a time-stamp 1 second prior to that of $P_1V_1$ since the Late Pump Read Rule criteria all apply. When using the "Early Read Rule" one would create $P_1V_3$, with a time-stamp 1 second later to that of $P_1V_2$ since the Early Pump Read Rule criterion all apply.

Using the known flow rates between all time-stamped pump or dispenser readings, the CIM system 120 can interpolate a pump or dispenser sales reading for every pump or dispenser with a time-stamp equal to the time of each tank manifold volume reading. With this pump or dispenser sales reading determined, the CIM system 120 flow rate adjusts each tank manifold reading back to the "Time of Reconciliation," by adding the pump or dispenser sales volumes back to the tank manifold reading.

With all relevant data read or adjusted back to the Time of Reconciliation, the CIM system 120 can determine physical volume from the multiple series of tank manifold readings by averaging all time-aligned net inventory volume readings together to determine a mean physical inventory. A standard deviation can also be calculated for the sample set of tank manifold readings, and readings that are +/−X standard deviations from the computed mean may be thrown out (where X may be user defined or some fixed value, e.g., 1 standard deviation). The remaining tank manifold readings can then be averaged to generate the net physical volume at Time of Reconciliation. Using statistical methods known to those of skill in the art, a confidence level can also be shown for the volume determined using this method. As before, this confidence level is a function of the number of samples taken and the duration of the sampling size.

Once the net physical volume is determined, this net physical volume at Time of Reconciliation can be adjusted by the CIM system 120 for any interim sales associated with the manifold by adding back to the net physical volume at the time of reconciliation, the net interim sales at the time of reconciliation, which consist of interim active sales, interim completed sales, and interim stacked sales as described herein. In other words, those sales that were not already compensated for in the extrapolated dispenser or pump process previously described should be added back to the physical volume, since these sales will not appear on the book balance.

With the adjusted value, the CIM system 120 can then calculate the variance of adjusted net physical volume to perpetual book net volume, i.e., the volume identified by various transactions, with the volumes associated with the various transactions being converted to net temperature (e.g., 60° F.) volume terms before being added to the book balance. This variance calculation can include updating the net perpetual book balance to the Time of Reconciliation, and subtracting net perpetual book balance from adjusted net physical volume.

The following paragraphs illustrate one embodiment of a system for standardizing a volume of a liquid product. The liquid product is delivered from a fuel source by the carrier 105 (FIG. 1) to the retail facility storage tank 155 (FIG. 1) and is then delivered from the retail facility storage tank 155 through the dispenser 145 (FIGS. 1 and 3) to a consumer. The system can include the volume measurement device 108 (FIG. 1) that measures a gross volume of liquid product upon delivery of the liquid product to the carrier 105 and generates volume data indicative of this gross volume. The system can also include the temperature measurement device 107 (FIG. 1) that measures a temperature of liquid product upon delivery of the liquid product to the carrier 105 and generates temperature data indicative of this temperature. Furthermore, the system can include a volume measurement device 165 (FIG. 1) that measures a gross volume of liquid product at the retail facility storage tank 155 and generates storage tank volume data indicative of this gross volume. Likewise, the system can include a temperature measurement device 165 that measures a temperature of liquid product at the retail facility storage tank 155 and generates storage tank temperature data indicative of this temperature. The system can further include a time-stamp system 137 that can be located, by way of example and not limitation, in the tank gauge console 135 (FIG. 1) configured to receive the storage tank volume data and the storage tank temperature data and to allocate a time-stamp to the storage tank volume data and the storage tank temperature data. Further still, the system can include a dispenser volume measurement device 224, 226 (FIG. 3) that measures a gross volume of liquid product at a dispenser and generates dispenser volume data indicative of this gross volume, a dispenser temperature measurement device 230 (FIG. 3) that measures a temperature of liquid product at the dispenser and generates dispenser temperature data indicative of this temperature, and a time-stamp system 137 (FIG. 1) configured to receive the dispenser volume data and the dispenser temperature data and to allocate a time-stamp to the dispenser volume data and the dispenser temperature data.

In some embodiments, the time-stamp system 137 at the retail facility storage tank 155 communicates with the volume measurement device 165 and the temperature measurement device 165 at the retail facility storage tank 155 so as to receive volume data and temperature data and allocate a time-stamp to the volume data and temperature data generated at the retail facility storage tank 155. The time-stamp system 137 at the dispenser 145 communicates with the volume measurement device 224, 226 and the temperature measurement device 230 at the dispenser 145 so as to receive volume data and temperature data and allocate a time-stamp to the volume data and temperature data generated at the dispenser 145.

In one embodiment, the volume measurement device 108 that measures a gross volume of liquid product upon delivery of the liquid product to a carrier and the temperature measurement device 107 that measures temperature of liquid product upon delivery of the liquid product to a carrier, respectively, measure the volume and temperature of the liquid product as the liquid product is delivered from the distributor fuel source to the carrier. Alternately, the volume measurement device that measures a gross volume of liquid product upon delivery of the liquid product to a carrier and the temperature measurement device that measures temperature of liquid product upon delivery of the liquid product to a carrier, respectively, are located at one of (i) a fuel source located with a distributor, (ii) the carrier and measure the volume and temperature of the liquid product located within the carrier. The volume measurement device that measures a gross volume of liquid product and the temperature measurement device that measures temperature of liquid product upon delivery of the liquid product to a carrier, respectively, may measure the volume and temperature of the liquid product when the carrier is located at a fuel source at a distribution facility.

Once the time-stamps are assigned, the volume and temperature data can be adjusted back to a single point in time, so that net volumes can be calculated and used to update the book balance during the reconciliation process. By time-stamping the volume and temperature data, the flow of liquid product from the tank(s) and dispenser(s) at the retail facility can be accurately measured and so relied upon during the reconciliation process.

In making the above mentioned calculations for tank volume, and as discussed herein, it is desirable to identify the height of the fuel in the tank and use this measurement to determine the volume of liquid product within a tank. One manner or method for converting the height of the fuel to a volume is by way of a calibration chart, and associated processes. The tank manufacturer provides a chart that can be used to make the height to volume conversions on a finite scale. However, the manufacturers chart may assume that the tank was placed in the ground exactly horizontally and vertically, and/or that the tank was manufactured to an exact standard. If the tank is slightly off from the horizontal, vertical or the standard, this can affect the height to volume conversion. It is sometimes necessary to calibrate the expected height to volume relationship to account for this slight discrepancy. This can be accomplished by identifying variance as a function of either height or volume in the tank.

It should be noted that the calibration process is not limited to a single tank. In many cases, there are multiple storage tanks holding the same type of product that are manifolded together to form a manifolded group. A manifolded group can be a group of one or more tanks allowing a cross-flow of product or a group of one or more tanks that are plugged into a single trunk line going to a group of dispensers. In either case, a manifolded group can include multiple tanks that, because liquid product flows out of one or more of the tanks to the dispensers during delivery to a consumer, the flow of the liquid product can't be tied back to any one of those tanks individually. Likewise, because there is cross-flow of product between those tanks, it is not feasible to keep an accurate book inventory on any one of those tanks individually. However, accurate book inventory can be maintained for the group. In some embodiments, the calibration process can be used to calibrate the manifolded group, rather than the individual tanks within the group.

In order to perform the calibration process, it is desirable to ensure that the manifolded group is normalized. The various gauges in the tanks in the group can give different readings at any one time. For example, one tank could read 65 inches, another 64 inches, and a third 61 inches. As long as this difference remains relatively constant, the tanks can be considered normalized. In other words, if all of the height values across all of the tanks in the tank group can be shown to have moved in parallel fashion when product is added or removed, i.e., the measured heights all moved up or down one inch, the group can be considered normalized, and the calibration process can be conducted. The degree to which the tank manifold group is normalized can be shown using a method of tracking the standard deviation of height difference of the contents of the tanks in the manifold group, across multiple sample readings of those heights. Tolerance limits can be set allowing the system to identify which reconciliation samples can be qualified for consideration in the calibration process.

Keeping in mind that there are many ways to perform this calibration process, two such ways will be discussed herein. In a first method, a single tank or manifolded series of tanks is filled. The product is then pumped out until the tank(s) can be considered empty. Measurements are made at incremental levels as the product is dispensed. These measurements can then be used to generate a calibration curve that allows a retail facility to read the level of product in the tank(s) and know with some accuracy how much variance there is in that measured reading. Variance that falls outside the limits of the calibration curve can then be initially unexplained variance. Using the various systems and methods discussed above, this initially unexplained variance can then be explained. This first method will be discussed in detail below with reference to FIGS. 8-11. In a second method to accomplish the calibration process, historical data can be used to determine the calibration curve. This second method will be discussed below with reference to FIG. 12.

The first method will be discussed with reference to FIGS. 8-11 and Table 5, shown below. Initially, the CIM system 120 treats the manufacturer's height vs. volume chart as if the chart was correct when the tank is filled. For instance, data representative of the manufacturer's chart can be stored in data storage at the CIM system 120 (FIG. 1). Initial variance between manufacturer's chart and calibrated chart pending is then zero. For instance,

TABLE 5

| Manufacturer's Chart | | Calibrated Chart | |
|---|---|---|---|
| Height | Volume | Height | Volume |
| 108" | 19122 | 108" | 19122 |

Using Table 5 above, the fuel reconciliation process can be started as previously describe herein. When the next volume measurement is received (i.e. after the predefined amount of fuel has been dispensed), the CIM system 120 (FIG. 1) can then calculate the variance from our "expected" volume based on the manufacturer's charts. Below are examples of formulas that can be used to calculate the variance, with the identified volumes being adjusted to the average manifold temperature as taught herein:

$$\text{Gross\_volume\_from\_chart\_readings} = \text{expected\_volume} \quad (2)$$

$$\text{Gross\_Initial\_volume} - \text{dispensed\_volume} = \text{calibrated\_volume} \quad (3)$$

$$\text{Calibrated\_volume} - \text{expected\_volume} = \text{variance} \quad (4)$$

The variance can be calculated every time a new volume measurement is received during this tank calibration process. For example, a measurement can be received for every hundred gallons of fuel dispensed. When all volume and variance measurements have been calculated, the CIM system 120 (FIG. 1) can generate the volume vs. the variance and the volume vs. height relationships for when the tank is tilted or otherwise deformed. Examples of these are illustrated in FIGS. 8 and 9.

Figure 8:
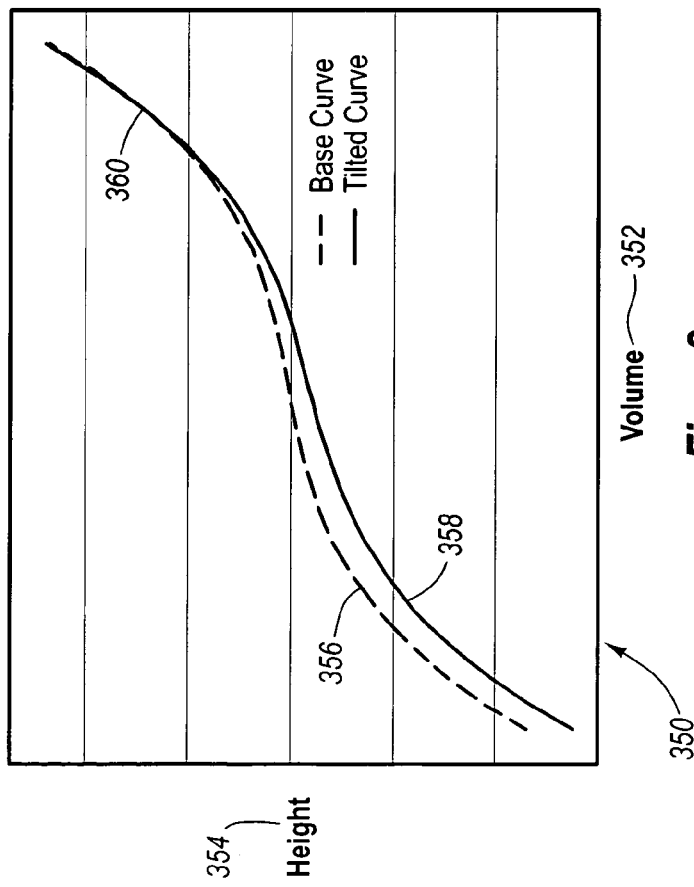
FIG. 8 illustrates a graphical representation of an exemplary volume vs. height graph usable in the tank calibration process of the present invention.

FIG. 8 illustrates a chart 350 comparing a volume 352 in the tank to a measured height 354 of the gauge in the tank. A base curve 356 represents the curve if the tank is sitting exactly upright, while a tilted curve 358 represents the curve for the tank as it is actually sitting. These two curves 356, 358 cross at a point 360, which represents the assumption that there is no variance when the tank is full.

Figure 9:
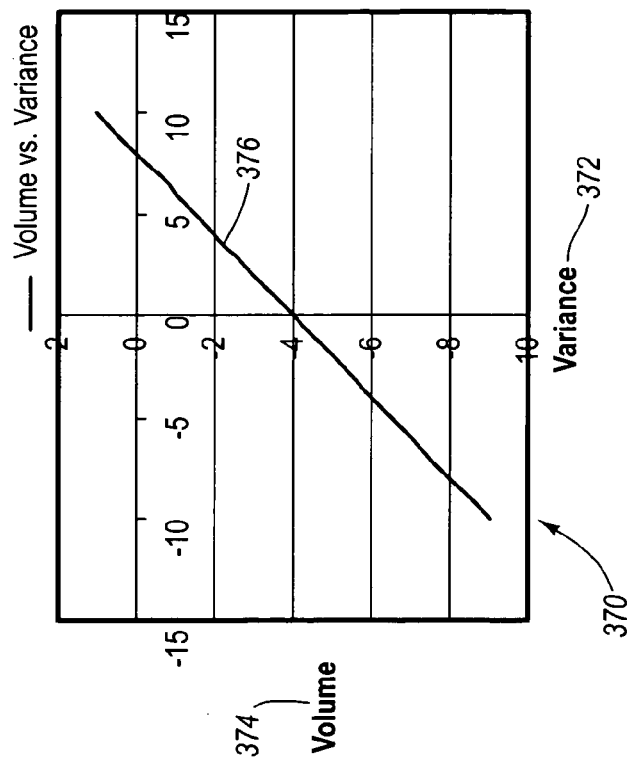
FIG. 9 illustrates a graphical representation of an exemplary volume vs. variance graph usable in the tank calibration process of the present invention.

FIG. 9 illustrates one possible corresponding volume to variance chart 370. Chart 370 plots an actual variance 372 versus a measured volume 374, represented as line 376. From these initial graphs 350, 370, and data indicative of the curves and lines, the CIM system 120 (FIG. 1), and more generally one or more methods and/or processes of the present invention, can determine if the volume and the variance have a significant relationship.

Figure 11:
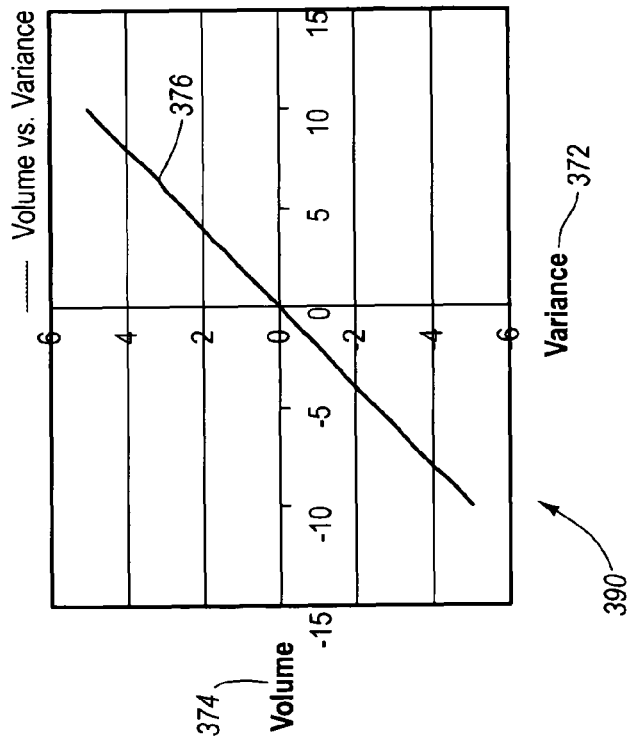
FIG. 11 illustrates another a graphical representation of an exemplary volume vs. variance graph usable in the tank calibration process of the present invention.
Figure 10:
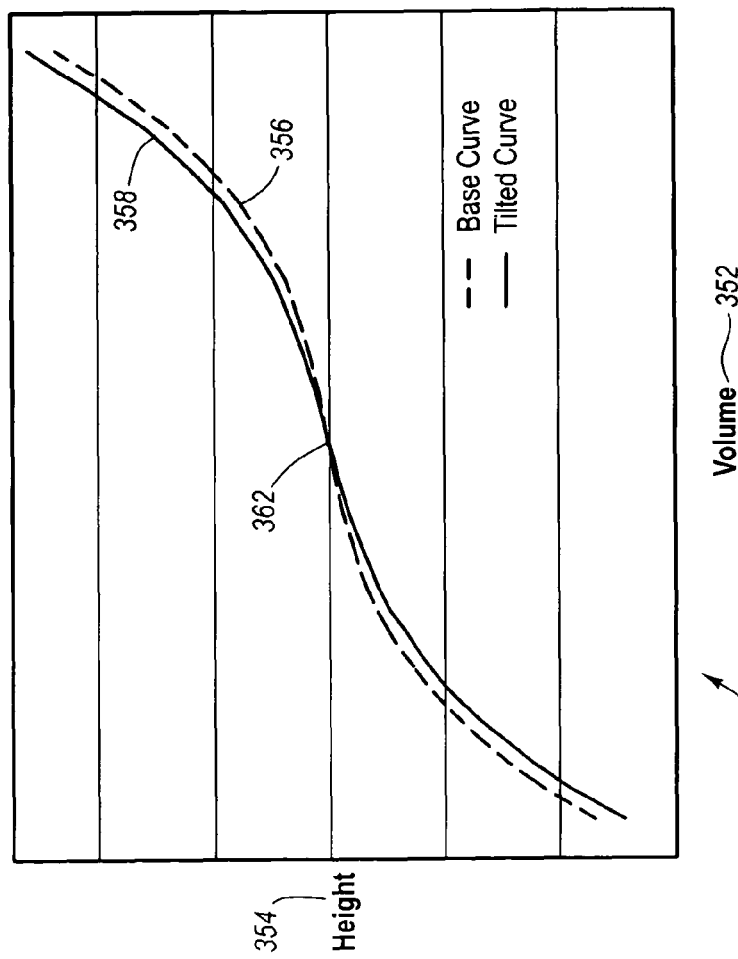
FIG. 10 illustrates another graphical representation of an exemplary volume vs. height graph usable in the tank calibration process of the present invention.

It is understood that the initial assumption that there is no variance when the tank is has been filled could be false. Primarily, the tank could be distorted such that the fill capacity differs from the manufacturer's specification, or perhaps the tank was not completely filled at all. However, because of the relationship between volume and variance shown, the CIM system 120 (FIG. 1) can shift the calibrated curve in such a manner as to minimize the least squares difference in the calibration curve and the original curve. This can produce a graph 378, like that shown in FIG. 10, which gives a more accurate representation of the volume to measured height relationship. Note that in this graph 378, the cross over point between the base curve 356 and the tilted curve 358 is now at a new point 362, which can approximate an intermediate point of both curves 356 and 358. A new volume to variance graph 379 can also be created, as illustrated in FIG. 11.

Once the graphs 378, 379 have been generated, the CIM system 120 (FIG. 1) can generate data, such as but not limited to, one or more formulae that represent the curve and illustrate the variance as a function of height or inventory volume. The formulae identify the expected variance for any volume measurement on a specified tank manifold. Any variance observed deviating from this line can be an unexplained variance, which can be subject to later assignment through correlation analysis. Since the exact position of a tank underground is different for every tank, this process is completed for each tank in the system 100 (FIG. 1) or for each series of manifolded tanks.

A height to volume reference chart derived from the variance curve discussed above can have the form as follows.

TABLE 6

| Height (Inches) | Volume Formula |
|---|---|
| 0 | 2.6613 × 2 + 50.029X |
| 5 | 3.5 × 2 + 48.5 X − 6 |
| 9 | 2.75 × 2 + 59.95 X − 50.35 |
| 13 | 2 × 2 + 78.6 X − 167.7 |
| 17 | 2 × 2 + 79 X − 174 |
| 21 | 1.5 × 2 + 99 X − 377.5 |
| ... | ... |

Any height measurement of liquid product with the tank between numbers on the chart can use the formula of the lowest number. For example, if the measured value is 5.5 inches, since 5.5 inches is greater than 5 but less than 9, the CIM system 120 (FIG. 1) can use the data or formula indicated by height 5, where X is the measured height. The use of such a piecewise data or formula chart allows infinite interpolation capability between the known values.

During the above-described tank calibration process, it is desirable to append the temperature and representative density of the fuel tank manifold, along with the temperature and representative density of the fuel being dispensed, to every sales transaction. This can be done so the gallons dispensed can be converted to what they would have been at the tank temperature. This method can minimize bias in the tank calibration curve, and therefore increase the accuracy of the system 100 (FIG. 1). The following describes one example of a process to accomplish this.

In order to correct for temperature, the temperature of the fuel in the tank is accurately measured. Most tanks use a series of thermistors located at periodic height within the tank to make these measurements, as described previously. By way of example and not limitation, if the tank is a standard 10 foot tall tank, thermistors could be located at heights of 20, 40, 60, 80 and 100 inches. Depending on the measured height of the fuel, one or more of these thermistors would be read to ascertain the fuel temperature in the tank. If one or more of these thermistors are above the level of the fuel, they can be ignored as the air temperature in the tank can differ markedly from the actual fuel temperature. In alternate embodiments, a thermistor attached to the float that measures the fuel height can be used to measure the fuel temperature. When the process is started, a period inventory temperature can be calculated by averaging the temperature from the prior and current reconciliations. The derived period inventory temperature can be used by the CIM system 120 (FIG. 1) to temperature-correct each interim sales transaction to the same temperature as what prevailed in the inventory tanks. As previously mentioned, this can be done using only the thermistors in the tanks that are below the fuel level.

As fuel is dispensed, each transaction can be accompanied by a temperature or data indicative of the temperature of the fuel at the point of measurement in the fuel dispenser. When the reported sales volume, or Accum_Volume, reaches the next incremental threshold volume, or Volume_Increment, then the total manifold volume can be converted to net volume terms, using an ASTM certified method, to obtain a conversion factor for converting volumes at the tank temperature to equivalent volumes at a standardized temperature, (e.g., 60° F.). For example: the measured data could be Gross_Volume=10,000 gallons, temperature=73° F., and API Gravity=57.5. The calculated data to achieve the volume of fluid at 60° F. could be found using API Gravity at 60° F.=55.9, with a conversion factor=0.9914 and the following equation:

$$\text{Net\_Volume} = \text{Conversion\_Factor} * \text{Gross\_Volume} \quad (5)$$

This results in temperature corrected net volume being 9914=0.9914*10,000.

The CIM system 120 (FIG. 1) can perform a similar calculation to convert each transaction volume dispensed into net standard temperature (e.g., 60° F.) terms. Then the CIM system 120 (FIG. 1) can take the sum of the net volume dispensed, and divide it by the tank conversion factor used to bring the tank inventory to net standard temperature terms. The result is dispensed volume temperature corrected to prevailing tank temperature. For example, if the calculated net dispensed volume or Net_Disp_Vol=500 and the Tank_Conversion_Factor=0.9914, then, using equation 6 below, $$\text{Disp\_Vol\_at\_Tank\_Temp} = \text{Net\_Disp\_Vol} / \text{Tank\_Conversion\_Factor} \quad (6)$$

the dispensed volume temperature corrected to prevailing tank temperature=504.34 or 504.34=500/0.9914. It is the dispensed volume temperature corrected to prevailing tank temperature that the CIM system 120 (FIG. 1) can use to subtract from the previous tank volume to calculate the calibrated volume, as described herein.

Each time Accum_Volume reaches the Volume_Increment amount, a new manifold temperature can be measured, and an average temperature can be calculated between this current measurement and the previous manifold temperature. This process can be repeated until the tank calibration process is complete.

The CIM system 120 (FIG. 1) can periodically check the chart and data used to convert measured height of liquid within a tank to a volume of liquid within the tank, i.e., the strapping chart and data, for each tank within system 100 (FIG. 1). Each tank within the system 100 (FIG. 1) can have its own strapping chart and data. By periodically checking the chart and data, the accuracy of the strapping chart and the height to volume conversion factors can be periodically verified. When the CIM system 120 (FIG. 1) performs a periodic check, a notification can be sent to the retail facility 128 (FIG. 1) and associated retail system 130 (FIG. 1) indicating that the calibration is being performed and that no deliveries are allowed to the tank being checked. Following notification, a reconciliation process can be performed to verify fuel volumes and temperatures. When a disparity is identified, i.e., the existing tank strapping chart does not mirror the reconciled volume, the strapping chart can be modified to accommodate for the disparity.

Figure 12:
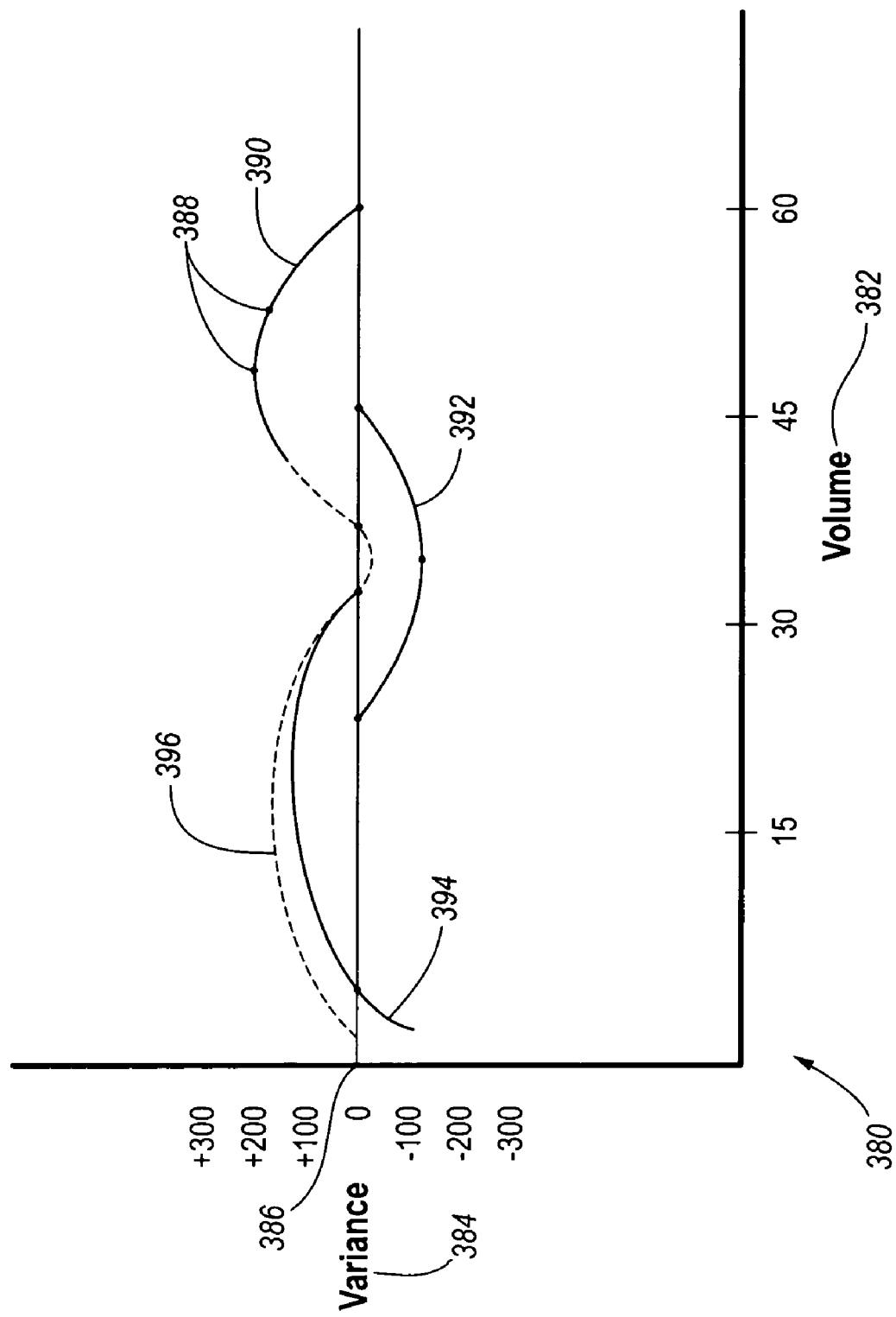
FIG. 12 illustrates yet another a graphical representation of an exemplary volume vs. variance graph usable in the tank calibration process of the present invention.

One disadvantage of the above system is that it restricts deliveries while the calibration process is ongoing. In large retail facilities, a single tank can be emptied of product in a matter of hours. A second method to calibrate the measurements has been developed to overcome this deficiency. This method is illustrated in FIG. 12, which is based on the data shown in Table 7 below. Note that, while Table 7 illustrates a manifolded group of tanks, a similar approach can be conducted to determine a calibration curve for a single tank.

TABLE 7

| Line # | Beg. Book | −Sales | +Deliveries | End Book | ATG | Variance |
|---|---|---|---|---|---|---|
| 1 | 60,000 | 10,000 | 0 | 50,000 | 50,100 | 100 |
| 2 | 50,100 | 5,000 | 0 | 45,100 | 45,200 | 100 |
| 3 | 45,700 | 5,000 | 0 | 40,200 | 40,100 | −100 |
| 4 | 40,100 | 10,000 | 15,000 | 45,100 | 45,000 | −100 |
| 5 | 45,000 | 10,000 | 0 | 35,000 | 34,800 | −200 |
| 6 | 34,800 | 5,000 | 0 | 29,800 | 29,900 | 100 |
| 7 | 29,900 | 5,000 | 0 | 29,900 | 25,000 | 100 |
| 8 | 25,000 | 5,000 | 10,000 | 30,000 | 30,100 | 100 |
| 9 | 30,100 | 10,000 | 0 | 20,100 | 20,200 | 100 |
| 10 | 20,200 | 5,000 | 0 | 15,200 | 15,200 | 0 |
| 11 | 15,200 | 10,000 | 0 | 5,200 | 5000 | −200 |
| 12 | 5000 | 1000 | 11,000 | 15,000 | | |

The data in Table 7 was generated as part of a tank calibration process, such as a calibration process described above. The tank calibration process can include modules, such as software modules and hardware modules, and/or functions which continually query a database accessible to the CIM system 120 (FIG. 1) and/or the retail system 130 (FIG. 1) to determine if a predefined amount of fuel has been dispensed. When the dispensed volume is greater than or equal to the volume increment, a fuel reconciliation can be performed which will calculate the variance from the expected volume based on the manufacturer's strapping charts and data. It will also calculate accumulated variance associated to a specific manifold volume, i.e., the volume of liquid product for one or more tanks manifolded or in fluid communication one to another. FIG. 12 and Table 7 were generated using formulas 2-4 shown above. In addition, the following formula also applies:

$$\text{accum\_variance}=\text{accum\_variance}+\text{variance} \quad (7)$$

FIG. 12 shows a graph 380 that illustrates the additional method of generating a calibration curve for a tank or a manifolded tank group. The Graph 380 includes a measure of tank volume 380 on the "X" axis, and a measure of a variance 384 on the "Y" axis. Using the data from Table 7, a plurality of data points 388 can be plotted on the graph 380. As shown on line 1 of Table 7, the beginning book balance is 60,000 gallons. It is assumed that 60,000 gallons is the approximate tank fill level. Furthermore, it is assumed that at 60,000 gallons, there is no variance. If there were 10,000 gallons of sales before the next reconciliation and no deliveries, the ending book balance, or the calculated value that one would expect to be in the tank and to be reported through the automatic tank gauge would be 50,000 gallons. But in reading the height of the product, and using the formulas derived from the manufacturer's data for those tanks, it could be reported through the tank gauge that there were 50,100 gallons. So the accumulated variance from the representative top of the tank down to this position of the tank can be shown as a function of manifold volume alone. This 100 gallons of positive variance can be expected to reoccur in the future. The variance is measured and added to the accumulated variance every time a new volume measurement is received from the Tank Calibration Process. Thus, for every volume measurement there is an associated accumulated variance that can be stored and plotted on the graph 380.

The 50,100 gallons becomes the new book balance. As shown in line 2 of Table 7, there is then an incremental 5,000 gallons of sales, which generates an ending book balance of 45,100. In reading the tank gauge and reading the strapping formulas or data, it could be determined that there were 45,200 gallons in the tank. These incremental points can then plotted on the graph 380, which shows these three data points 388 (one starting point and two reconciliation points). Row three of Table 7 then shows a beginning book balance of 45,200 gallons. There are 5,000 gallons in sales. The physical inventory should then be 40,200. However, at this point, the automatic tank gauge provides a reading of 40,100 gallons, which is a variance of −100 gallons. These four data points are then used to construct a curve 390.

In line four of Table 7, a delivery is made into the tank(s). Every time a delivery occurs during the calibration process, the system will perform another fuel reconciliation. This provides a new starting point in which the accumulated variance is set to zero. It is desirable to set the accumulated variance back to zero to minimize any effects from a possible delivery variance. For example, if the book shows that 15,000 gallons were delivered, but only 14,800 gallons were actually delivered, this could skew the calculations. Lines 5-7 in Table 7 can then be used to provide another set of data points 388, which can then used to generate a second curve 392. The above process is continued until the calibration process is finished, or another delivery is made. Any time a fuel reconciliation is run and the volume is greater than the previous reconciliation's volume, then a delivery has occurred. This is illustrated in the graph 380 as another curve 394. A user can include as many segments as desired and/or for which historical data exists. After defining the segments to be used, calibration formula and data for the tank or manifolded tanks can then be generated.

The calibration formula can be built from the segments 390, 392, and 394 that were generated from the actual data retrieved from the normal reconciliation processes. The identified segments can be assigned a hierarchy and can be connected by using a technique of minimizing the least squares distance of the overlapping portions of those segments. This aligned curve is represented as a dashed line 396 in FIG. 12.

From the data in Table 7 and the corresponding curves shown in FIG. 12, it can be identified that there is a pattern-like relationship between the manifold volume and the accumulated variance. Geometrically, it can be shown that tilt, deformation or any other inaccuracy in the tank specification, or the inventory measurement apparatus of any individual tank, can invalidate the original formula representing the height to volume relationship for that tank. Furthermore, it can be shown that such inaccuracies are consistent or static in nature, and can combine in aggregate to show a pattern-like relationship. The above process provides a curve that substantially reduces or even eliminates the differences between the actual installation and the manufacturer's original height to volume charts.

As long as there are a sufficient number of data points available in the historical data, the above method can be used to generate a volume to variance curve over the entire range of tank(s) volumes. Therefore, for a given measured volume, curve 396 represents the expected amount of variance due to the tank structure and/or placement. The curve 396 allows representation of both the variance that could be expected after filling the tank and later running a reconciliation at any fill level of the tank, or the incremental variance that could be expected between any two fill levels of the tank. Note that no operational limitations need to be imposed on the system to allow for the retrieval of the data to build the segments necessary to generate the calibration formula or data. No time period need be identified over which data is to be collected and analyzed, as is the case with the first method discussed above with reference to FIG. 8-11. Additionally, the process outlined above with reference to Table 7 and FIG. 12 allows for a periodic re-calibration on an as desired basis.

As alluded to above, methods, systems, and computer program products can be used with the system 100 of FIG. 1 to probe end-to-end fuel temperature at various points, including all points of physical measurement for temperature correcting volume across the fuel management system. Because of the reporting of the temperatures through, for example, the antenna 234 (FIG. 3) within the dispenser unit 145, and by using temperature readings taken during the rapid accumulation of data at other locations within the system, such as at the tank 155, this system 100 and the CIM system 120 allow for both consideration of and, where necessary, provides actual temperature measurements for, all points of physical measurement.

In particular, fuel temperatures can be measured at the loading rack 105 (as recorded in e.g., the bill-of-lading), at the liquid product storage tank 155, and at the fuel dispenser 145. There can be significant temperature change occurring both during delivery to retail facility 128 from the load rack 105, as well from the liquid product storage tank to the fuel dispenser 145. Therefore, the thermal expansion/contraction of the product can be taken into account in each transaction and in each executed reconciliation process. In other words, to allow true reconciliation to occur in net gallon terms, it is desirable to measure temperature in conjunction with every measurement of physical volume. Therefore, temperature and volume data can be collected from the dispenser and during any sales transactions for use in the reconciliation process performed by the CIM system 120.

The temperature readings of a dispensed sale at a dispenser 145 are unique per sales transaction, and are a function of one or more of the following variables: fluid temperatures; surrounding ground temperatures; pipe wall thickness; pipe wall material; proximity of the dispenser skirt relative to rays of the sun; ambient air temperature; fluid flow rate; and the duration of time since the last transaction. As previously mentioned, the methods, systems, and computer program products described herein allow one temperature to be measured in conjunction with the sale, regardless of whether the temperature correction is applied to the retail sale. Accordingly, the control module 228 (FIG. 3) of dispenser 145 can report the gross volume of the sale and the temperature of the sale separately, which can also be reported by the retail system 130. This gross volume and temperature reporting advantageously provides for compensation of the different temperatures throughout the system 100, and offers both gross and net volume reporting not currently offered by typical dispensers.

Similarly, the methods, systems, and computer program products described herein provide for the perpetual net inventory book balance to be modified by a dynamic expansion coefficient of product relative to the temperature changes and density. Based on the API gravity report at the rack 105 and reported in the BOL, the CIM system 120 maintains data representative of fuel densities throughout the lifecycle of the fuel or product within the system 100. The storage and updating of such representative density values, combined with the updating and storage of temperature values, allows the CIM system 120 to dynamically identify the appropriate gross to net conversion for any physical measurement of fuel. With this data, the temperature-compensated amount of product used and remaining in the tank 155 can be accurately determined. For example, the CIM system 120 can use the temperature and density to perform a temperature corrected gross to net conversion for every transaction before posting to the net perpetual book balance.

The temperature correction hinges around the actual temperature of the fuel or product that is being temperature corrected, and the density of the fuel or product that is being temperature corrected. The density doesn't allow one to perfectly identify the elasticity between the volume and temperature of that fuel or product (i.e., it doesn't allow you to perfectly identify the coefficient of expansion). But since molecular chains, hydrocarbons in particular, that have similar density, react very similarly to temperature, the use of density and temperature is the most generally accepted method across all facets of industry.

Because the density of the product changes, it is only necessary to know the density value consistently and within reasonableness. In comparing two products of non-like density or differing density, their reaction to temperature change will be different. So the terminal systems (i.e. the rack 105), because of the amount of volume that they store and deliver, are required to report density. Most of them have the ability to measure density using densitometers or other measuring equipment that can be used to determine the value. They report that on the bill of lading. A weighted average or a FIFO (first-in-first-out) average of the density reportedly going into the tank can then be weighted by the amount of volume going into the tank. This provides a representative density for the product that is in the storage tank. That density value and the temperature that is measured on a real-time on-site basis are used to determine a temperature corrected volume conversion factor allowing one to derive the net volume of that product.

It should be noted that the various reports and accumulated data can be transmitted using Extended Markup Language (XML) document format or any other format readable by computer systems. Using XML, for example, sales transaction records can include headers that identify the status of a sale, the time of the sale, the invoice number and other such information in a standard XML document. In such instances, non-blended product would simply have a tank number, whereas, if a blended product is used, then the tanks and blend ratios can be given and separated using a standard means, e.g., separated by commas. Transaction date and time can also be associated with the transaction record along with an invoice number, volume and temperature.

The system can also determine a correlation between the variance and all of the qualitative and quantitative variance factors. It can accomplish this using multiple regression analysis. This allows the system to be able to indicate if there is a leak in a fuel tank, plumbing or dispensers. It also allows the system to determine if a dispenser needs to be recalibrated, if someone is stealing fuel, or if a truck has a leak or holds back fuel during a delivery. This is just some of the useful information the CIM system can provide.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 13:
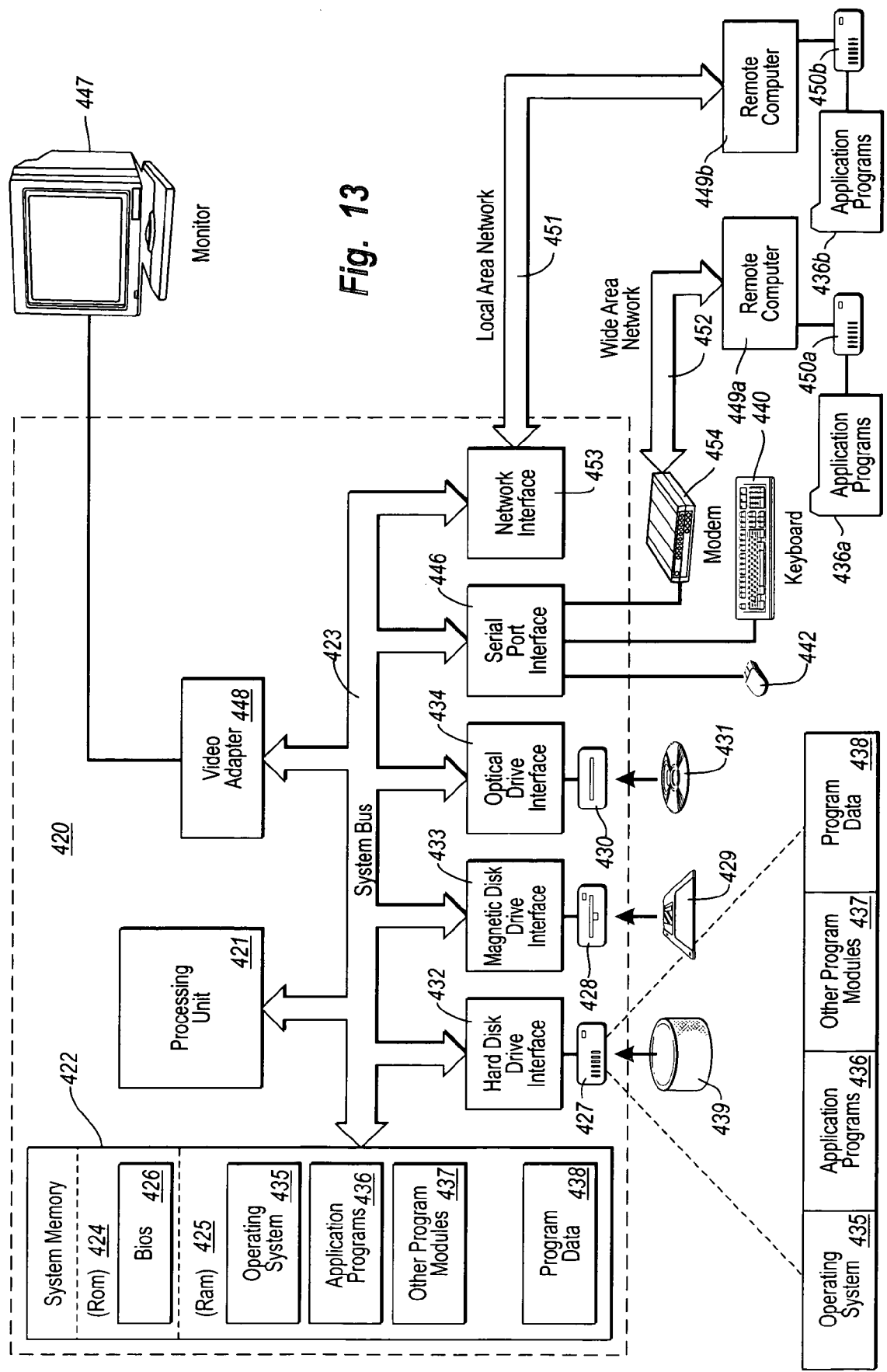
FIG. 13 illustrates a schematic representation of a computer and associated systems within which various embodiments of the present invention can be implemented.

FIG. 13 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 13, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing an on-demand book balance to physical balance reconciliation process, the method comprising:

calculating a first physical volume of liquid fuel product in one or more underground liquid fuel product storage tanks at a first reconciliation time by collecting a first set of volume measurement data using one or more tank sensors and one or more dispenser sensors;

automatically performing a first book balance to physical balance reconciliation of said one or more underground liquid fuel product storage tanks at a retail facility prior to receiving a delivery of liquid fuel product by comparing said first physical volume with a first book balance indicating an expected volume of liquid fuel product in said one or more underground liquid fuel product storage tanks at the first reconciliation time;

following completion of said first book to physical balance reconciliation, delivering an amount of liquid fuel product as indicated on a delivery document from a carrier to said one or more underground liquid fuel product storage tanks;

monitoring a delivery flow rate of liquid fuel product using a flow monitor as the liquid fuel product is delivered to said one or more underground liquid fuel product storage tanks;

monitoring a dispenser flow rate of liquid fuel product using said one or more dispenser sensors as the liquid fuel product is dispensed from said one or more underground liquid fuel product storage tanks;

determining that an amount of liquid fuel product has been delivered based upon at least said monitored delivery flow rate and said monitored dispenser flow rate;

collecting a second set of volume measurement data, upon determining that the amount of liquid fuel product has been fully delivered, using said one or more tank sensors and said one or more dispenser sensors;

calculating a second physical volume of liquid fuel product in said one or more underground liquid fuel product storage tanks which is adjusted for effects of liquid fuel product ripples caused by delivery of the liquid fuel product by filtering said second set of volume measurement data by eliminating any measurement that has a value plus or minus a predetermined number of standard deviations from a sample mean; and automatically performing a second book to physical reconciliation process by comparing the second physical volume with a second book balance indicating an expected volume of liquid fuel product in said one or more underground liquid fuel product storage tanks at the second reconciliation time to identify one or more discrepancies between said indicated amount of liquid product and a physical amount of liquid product actually delivered to said one or more liquid product storage tanks.

2. The method as recited in claim 1, further comprising performing said first book balance to physical balance reconciliation while fuel is dispensed from said one or more underground liquid fuel product storage tanks.

3. The method as recited in claim 1, further comprising using a centralized management system to determine whether the amount of liquid fuel product has actually been delivered to said retail facility.

4. The method of claim 3, wherein said amount is indicated on a delivery document provided by a carrier of the liquid fuel product.

5. The method of claim 4, further comprising measuring both a gross volume and a temperature of the liquid fuel product both in said one or more underground liquid fuel product storage tanks and at a dispenser while the liquid fuel product is dispersed and using said volume and temperature measurements to convert all measured volumes into a net volume at 60° Fahrenheit.

6. The method of claim 5, further comprising appending a time-stamp to all physical measurements of the liquid fuel product and converting all of said measurements to a common time.

7. The method as recited in claim 1, further comprising reporting a discrepancy between amounts reportedly delivered and amounts that were actually delivered to at least one of a carrier, the retail facility, and a centralized management system.

8. The method of claim 1, further comprising monitoring a the volume of liquid product in said one or more liquid product storage tanks.

9. The method of claim 8, further comprising determining that an amount of liquid product has been fully delivered based on said monitored delivery flow rate, said monitored dispenser flow rate, and said volume of the liquid product said one or more liquid product storage tanks.

10. The method of claim 1, further comprising monitoring said delivery flow rate as the liquid fuel product passes from the carrier through piping toward said one or more underground liquid fuel product storage tanks.

11. The method of claim 10, further comprising monitoring said delivery flow rate of the liquid fuel product before the liquid fuel product is delivered into said one or more underground liquid product storage tanks.

12. In a system having a centralized management system, a method for performing an on-demand reconciliation process, the method comprising:

using the centralized management system to perform a book balance to a physical balance reconciliation of one or more in-ground liquid fuel product storage tanks at a retail facility while a liquid fuel product is dispensed from said one or more in-ground liquid fuel product storage tanks;

receiving a delivery of an amount of liquid fuel product from a carrier;

monitoring a first flow rate of liquid fuel product as the liquid fuel product passes from the carrier through a conduit toward said one or more in-ground liquid fuel product storage tanks using one or more flow sensors, said first flow rate of liquid product being monitored before the liquid fuel product is delivered into said one or more in-ground liquid fuel product storage tanks;

monitoring a second flow rate of liquid fuel product as the liquid fuel product is dispensed from said one or more in-ground liquid fuel product storage tanks using one or more dispenser sensors;

confirming that the delivery of liquid product has been completed based upon at least said monitored first flow rate;

collecting a first set of measurement data from one or more of said one or more flow sensors, said one or more dispenser sensors, and one or more tank sensors;

calculating a physical volume of liquid fuel product in said one or more in-ground liquid fuel product storage tanks which is adjusted for effects of liquid fuel product ripples caused by delivery of the liquid fuel product by:

generating a second set of measurement data by eliminating any measurement data from said first set of measurement data that is identified as being unreliable;

determining a sample mean and a standard deviation for said second set of measurement data;

filtering said second set of measurement data to generate a third set of measurement data by eliminating any measurement data from said second set of measurement data that has a value plus or minus a predetermined number of the standard deviations from the standard mean for said second set of measurement data; and following a confirmation that the delivery of the liquid fuel product has been completed, performing a second book to physical reconciliation process using said calculated physical volume to identify one or more discrepancies between (A) the amount of said liquid fuel product reportedly delivered to said one or more storage tanks; and (B) the physical liquid fuel product actually contained within said one or more in-ground liquid fuel product storage tanks.

13. The method of claim 12, wherein said amount is indicated on a delivery document provided by a carrier of the liquid fuel product.

14. The method of claim 13, further comprising measuring both a gross volume and a temperature of the liquid fuel product both in said one or more in-ground liquid fuel product storage tanks and at a dispenser while the liquid fuel product is dispersed and using said volume and temperature measurements to convert all measured volumes into a net volume at 60° Fahrenheit.

15. The method of claim 14, further comprising appending a time-stamp to all physical measurements of the liquid fuel product and converting all of said measurements to a common time.

16. The method as recited in claim 12, further comprising reporting a discrepancy between amounts reportedly delivered and amounts that were actually delivered to at least one of a carrier, the retail facility, and the centralized management system.

17. The method as recited in claim 12, further comprising: notifying a carrier in the event that a reported amount of liquid fuel product was not actually delivered to the retail facility.

18. The method of claim 17, further comprising measuring both a gross volume and a temperature of the liquid fuel product using at least one sensor located at a dispenser that is configured to disperse liquid fuel product to a customer and using said volume and temperature measurements to determine a net, temperature adjusted volume of liquid fuel product dispersed to the customer.

19. The method of claim 18, further comprising appending a time-stamp to all physical measurements of the liquid fuel product and converting all of said measurements to a common time.

20. A method as recited in claim 17, wherein the additional book to physical reconciliation process are performed at five minute intervals.

21. In a system having a centralized management system, a method for performing an on-demand reconciliation process, the method comprising:

monitoring a delivery flow rate of liquid fuel product as the liquid fuel product is delivered into one or more underground liquid fuel product storage tanks using one or more flow sensors;

monitoring volume data of liquid fuel product in said one or more underground liquid fuel product storage tanks using one or more tank sensors;

monitoring a dispenser flow rate of liquid fuel product as the liquid fuel product is dispensed from said one or more underground liquid fuel product storage tanks;

calculating a physical volume of liquid fuel product in said one or more underground liquid fuel product storage tanks which is adjusted for effects of liquid fuel product ripples caused by delivery or dispersal of the liquid fuel product by filtering said volume data by eliminating any measurement that has a value plus or minus a predetermined number of standard deviations from a sample mean;

automatically performing a book balance to physical balance reconciliation of said one or more liquid product storage tanks at a retail facility based upon said monitored delivery flow rate, said monitored dispenser flow rate, and said calculated physical volume upon receipt of a reconciliation request; and following said reconciliation, performing at regular intervals additional book to physical reconciliation processes to identify one or more discrepancies between (A) an amount of liquid fuel product reportedly contained within said one or more underground liquid fuel product storage tanks; and (B) physical liquid fuel product actually contained within said one or more underground liquid fuel product storage tanks.

22. A computer program product for implementing a method for performing an on-demand reconciliation process, the computer program product comprising one or more computer readable media having stored thereon computer executable instructions that, when executed by a processor, can cause the distributed computing system to perform the following:

performing a book balance to a physical balance reconciliation of one or more underground liquid fuel product storage tanks at a retail facility while fuel is dispensed from said one or more underground liquid fuel product storage tanks;

monitoring a first flow rate of liquid fuel product as the liquid fuel product passes from a carrier through piping toward said one or more underground liquid fuel product storage tanks;

monitoring a second flow rate of liquid fuel product as said liquid fuel product is dispensed from said one or more underground liquid fuel product storage tanks;

confirming that the delivery of liquid fuel product has been completed based upon at least said monitored first flow rate and said monitored second flow rate;

collecting volume measurement data from one or more tank sensors within said one or more underground liquid fuel product storage tanks;

calculating a physical volume of liquid fuel product in said one or more underground liquid fuel product storage tanks which is adjusted for effects of liquid fuel product ripples, caused by delivery or dispersal of the liquid fuel product, by filtering any measurement data from said volume measurement data that has a value plus or minus a predetermined number of standard deviations from a sample mean based on an expected volume within said one or more underground liquid fuel product storage tanks; and following a confirmation that the delivery of the liquid fuel product has been completed, performing an additional book to physical reconciliation process to identify one or more discrepancies between (A) an amount of liquid fuel product reportedly delivered to said one or more underground liquid fuel product storage tanks; and (B) physical liquid fuel product actually contained within said one or more underground liquid fuel product storage tanks.

23. The computer program product of claim 22, further comprising measuring both a gross volume and a temperature of the liquid product both in the one or more liquid product storage tanks and at a dispenser while the liquid product is dispersed.

24. The computer program product of claim 23, further comprising appending a time-stamp to all physical measurements of the liquid product and converting all of said measurements to a common time.

25. The computer program product of claim 23, further comprising monitoring said first flow rate of the liquid fuel product before the liquid fuel product is delivered into said one or more underground liquid fuel product storage tanks.

* * * * *